United States Patent
Fukuchi et al.

(10) Patent No.: US 9,179,191 B2
(45) Date of Patent: Nov. 3, 2015

(54) INFORMATION PROCESSING APPARATUS, INFORMATION PROCESSING METHOD, AND PROGRAM

(75) Inventors: Masaki Fukuchi, Tokyo (JP); Takayuki Yoshigahara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 721 days.

(21) Appl. No.: 12/646,214

(22) Filed: Dec. 23, 2009

(65) Prior Publication Data

US 2010/0169905 A1    Jul. 1, 2010

(30) Foreign Application Priority Data

Dec. 26, 2008    (JP) ................................ P2008-332131

(51) Int. Cl.
   *H04N 21/466*    (2011.01)
   *H04N 21/4223*   (2011.01)
   *H04N 21/442*    (2011.01)
   *H04H 60/33*     (2008.01)

(52) U.S. Cl.
   CPC ....... *H04N 21/4668* (2013.01); *H04N 21/4223* (2013.01); *H04N 21/44213* (2013.01); *H04H 60/33* (2013.01)

(58) Field of Classification Search
   CPC ............... H04N 21/4223; H04N 21/44213; H04N 21/4668; H04H 60/33
   USPC ...................... 725/10, 12, 9, 44–47
   See application file for complete search history.

(56) References Cited

U.S. PATENT DOCUMENTS

| | | | | |
|---|---|---|---|---|
| 4,695,879 | A  * | 9/1987  | Weinblatt ........................ | 725/10 |
| 7,120,880 | B1 * | 10/2006 | Dryer et al. ................... | 715/863 |
| 7,730,505 | B2 * | 6/2010  | Fukumiya et al. ............. | 725/10 |
| 8,065,254 | B1 * | 11/2011 | Das et al. ........................ | 706/46 |
| 2002/0087525 | A1 * | 7/2002  | Abbott et al. .................... | 707/3 |
| 2002/0178440 | A1 * | 11/2002 | Agnihotri et al. .............. | 725/10 |
| 2003/0063222 | A1 * | 4/2003  | Creed et al. ................... | 348/687 |
| 2003/0093784 | A1 * | 5/2003  | Dimitrova et al. ............. | 725/10 |
| 2005/0229199 | A1 * | 10/2005 | Yabe .............................. | 725/10 |
| 2006/0007135 | A1 * | 1/2006  | Imagawa et al. .............. | 345/156 |
| 2006/0093998 | A1 * | 5/2006  | Vertegaal ...................... | 434/236 |

(Continued)

FOREIGN PATENT DOCUMENTS

| | | |
|---|---|---|
| JP | 2001-126070 | 5/2001 |
| JP | 2004-312401 | 11/2004 |

(Continued)

OTHER PUBLICATIONS

Resnick, P. et al., "GroupLens: An Open Architecture for Collaborative Filtering of Netnews," Conference on Computer Supported Cooperative Work, pp. 175-186, (1994).

(Continued)

*Primary Examiner* — Randy Flynn
(74) *Attorney, Agent, or Firm* — Hazuki International, LLC

(57) ABSTRACT

An information processing apparatus includes a sight line detecting unit configured to detect a sight line of a viewer who is viewing content data and output sight line information which is a result of the detection, a viewing condition estimating unit configured to estimate a viewing condition of the viewer based on the output sight line information and visual attention information relating to the content data, and a content suggesting unit configured to make various suggestions with respect to the content data for the viewer based on the estimated viewing condition.

21 Claims, 15 Drawing Sheets

(56) References Cited

U.S. PATENT DOCUMENTS

| | | |
|---|---|---|
| 2006/0143647 A1* | 6/2006 | Bill .................................. 725/10 |
| 2007/0124756 A1* | 5/2007 | Covell et al. .................... 725/18 |
| 2007/0150916 A1* | 6/2007 | Begole et al. ................... 725/10 |
| 2007/0271580 A1* | 11/2007 | Tischer et al. .................. 725/35 |
| 2008/0228577 A1* | 9/2008 | Decre et al. ..................... 705/14 |
| 2009/0052859 A1* | 2/2009 | Greenberger et al. .......... 386/46 |
| 2009/0055853 A1* | 2/2009 | Jung et al. ....................... 725/10 |
| 2009/0070798 A1* | 3/2009 | Lee et al. ......................... 725/10 |
| 2009/0097822 A1* | 4/2009 | Hirata et al. .................... 386/95 |
| 2009/0217315 A1* | 8/2009 | Malik et al. ...................... 725/9 |
| 2010/0004977 A1* | 1/2010 | Marci et al. ..................... 705/10 |
| 2010/0011388 A1* | 1/2010 | Bull et al. ......................... 725/9 |
| 2010/0107184 A1* | 4/2010 | Shintani ........................... 725/10 |

FOREIGN PATENT DOCUMENTS

| | | |
|---|---|---|
| JP | 2006-180179 | 7/2006 |
| JP | 2006-254145 | 9/2006 |
| JP | 2006-277192 | 10/2006 |
| JP | 2007-274621 | 10/2007 |
| JP | 2008-160512 | 7/2008 |

OTHER PUBLICATIONS

S. Nigasawa et al., "A Possibility of Estimation of the Degree of Interest by Eye Movement—Based on the interviews to the specialists of eyeball movement", Social System Study, Ritsumeikan University Society System Research Institute, No. 5, pp. 73-93 (2002) Abstract.

Japanese Office Action dated Dec. 3, 2010, issued in JP 2008-332131.

* cited by examiner

FIG. 7

| THRESHOLD VALUE | VIEWING STATE | VIEWING STATE VARIABLE S |
|---|---|---|
| C_AWAY | AWAY | S_6 |
| C_SLEEPING | SLEEPING | S_5 |
| C_NOT_WATCHING | NOT WATCHING | S_4 |
| C_BORINGL2 | BORINGL2 | S_3 |
| C_BORINGL1 | BORINGL1 | S_2 |
| 0 | WATCHING | S_1 |

FIG. 9

| VIEWING STATE VARIABLE S | SUGGESTED ACTION | SUGGESTED ACTION VARIABLE A |
|---|---|---|
| S_1/ERROR | DO NOTHING | A1 |
| S_2 | VERIFY | A2 |
| S_3 | ACTION1 | A3 |
| S_4 | ACTION2 | A4 |
| S_5 | ACTION3 | A5 |
| S_6 | TURN OFF | A6 |

INFORMATION PROCESSING APPARATUS, INFORMATION PROCESSING METHOD, AND PROGRAM

BACKGROUND OF THE INVENTION

1. Field of the Invention

The present invention relates to an information processing apparatus, an information processing method, and a program, and particularly relates to an information processing apparatus, an information processing method, and a program that allow for making various suggestions relating to content data based on an condition in which a user views the content data.

2. Description of the Related Art

As the Internet and/or a cable television proliferates and the content business grows, it has become important to provide information and/or present content data selected from among massive information and/or content data based on the taste of each user and conditions of the situation in various scenes of daily life. Various methods have been implemented to achieve the above-described task.

There has been the technology referred to as collaborative filtering disclosed in "P. Resnick, N. Iacovou, M. Suchak, P. Bergstrom, and J. Ried 1. "GroupLens?: Open Architecture for Collaborative Filtering of Netnews." Conference on Computer Supported Cooperative Work, pp. 175-186, 1994". According to the collaborative filtering, a different user who reacts in the same way as a target user is determined based on the purchase histories and/or the action histories of a plurality of users. Then, a commodity product the target user had not experienced is recommended based on the history of the determined different user.

Consequently, the target user can receive recommendation for an unpurchased commodity product. Particularly, the target user can receive recommendation for a commodity product which is purchased and highly evaluated by a different user who reacts in the same way as the target user.

Thus, recommendation for a commodity product, which is attained through the collaborative filtering is effective for a user determining whether or not the commodity product should be purchased.

SUMMARY OF THE INVENTION

However, the collaborative filtering is not necessarily effective at making recommendation for content data, because the content data is kept being used by a user for more than a predetermined time, and the reaction of the user is changed in time sequence during the predetermined time.

For example, according to the content data recommendation attained through the collaborative filtering, the reaction of a different user is adopted as a standard used to select the recommended content data. However, the adopted reaction of the different user is the last reaction for the content data, such as "likable", "neither likable nor unlikable", "unlikable", and so forth. Namely, the content data recommendation attained through the collaborative filtering does not consider how the last reaction for the content data is obtained, that is to say, which part of the content data is likable and/or unlikable for the user, for example.

A user can consciously evaluate preferences for content data. However, it is difficult for the user to specifically describe that the content data is "likable" and/or "unlikable" with reference to the user's feelings about the content data in words.

The method of recommending content data by estimating the feelings of the user and searching for content data for which the user showed the same feelings as the estimated feelings can be considered. However, it is difficult to determine and recommend unknown content data that may interest the user through the above-described method. Further, there are users unexpressive for content data. In that case, the feelings of the above-described users are estimated with difficulty.

Therefore, it has been difficult to make a suggestion for content data based on the viewing condition of a user.

Accordingly, the present invention provides various suggestions relating to content data based on the viewing condition of a user.

An information processing apparatus according to an embodiment of the present invention includes a sight line detecting unit configured to detect a sight line of a viewer who is viewing content data and output sight line information which is a result of the detection, a viewing condition estimating unit configured to estimate a viewing condition of the viewer based on the output sight line information and visual attention information relating to the content data, and a content suggesting unit configured to make various suggestions with respect to the content data for the viewer based on the estimated viewing condition.

The viewing condition estimating unit further estimates a viewing state based on a result of the viewing condition estimation, and the content suggesting unit makes various suggestions with respect to the content data based on the estimated viewing state.

A viewing condition variable including the viewing condition of the viewer is defined and at least one predetermined type of viewing state is associated with each of at least two possible ranges of the viewing condition variable, and the viewing condition estimating unit estimates the viewing condition by calculating a value of the viewing condition variable, and estimates the viewing state by determining a viewing state of a type associated with a range to which the value of the viewing condition variable belongs of the at least two possible ranges.

At least one predetermined type of suggested action is associated with each of at least two types of the viewing states, and the content suggesting unit makes a suggestion for the viewer based on a suggested action of a type associated with the viewing state of a type determined through the viewing condition estimating unit.

A score which is variable based on a magnitude of the visual attention information about a region where a sight line of the viewer stays, and the viewing condition estimating unit calculates the score based on the sight line information output from the sight line detecting unit immediately before and visual attention information relating to the content data in a cycle of a predetermined time, and calculates a value of the viewing condition variable based on the score obtained on each of at least one occasion, which is obtained by the current period.

An information processing method and a program according to an embodiment of the present invention correspond to the above-described information processing apparatus according to the embodiment of the present invention.

According to an information processing apparatus, an information processing method, and a program according to an embodiment of the present invention, the sight line of a viewer who is viewing content data is detected, and sight line information which is a result of the detection is output, a viewing condition of the viewer is estimated based on the output sight line information and visual attention information relating to the content data, and various suggestions with respect to the content data are made for the viewer based on the estimated viewing condition.

The present invention allows for making various suggestions relating to content data according to a condition in which a user views the content data.

BRIEF DESCRIPTION OF THE DRAWINGS

FIG. 7 illustrates exemplary viewing state estimation processing performed at step S3 shown in FIG. 5 in detail;

FIG. 9 illustrates exemplary suggested action determination processing performed at step S4 shown in FIG. 5 in detail;

DESCRIPTION OF THE PREFERRED EMBODIMENTS

Figure 1A:
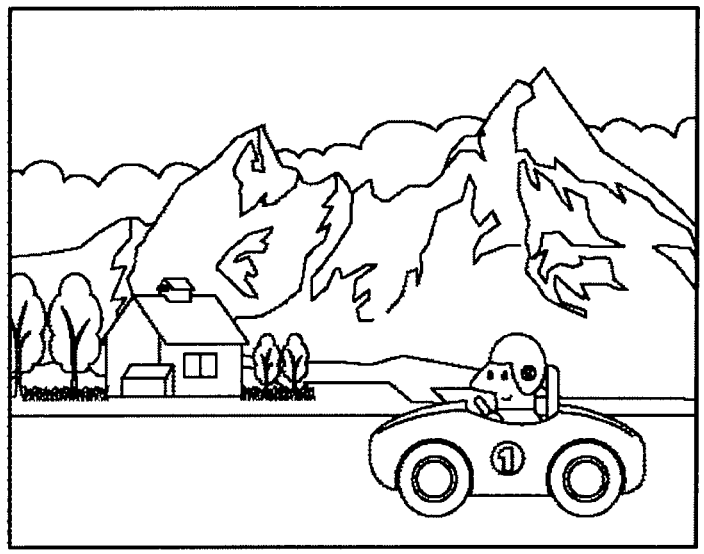
FIG. 1A is a diagram provided to illustrate the difference between the attention capturing degrees.

The present invention allows for making various suggestions relating to content data based on conditions in which a user views the content data.

Here, the term "content data" is generally construed as data produced through creative activities of a person. The present invention can be used for the entire content data.

For example, a program provided to present information about and/or related to the character, the drawing, the color, the voice, the action, or the video of a movie, music, a play, a literature, a photograph, a cartoon, animation, a computer game, etc., and/or a combination thereof via an electronic calculator is an example of the content data. Any example of the content data can be used for the present invention.

However, in the following descriptions, the content data may be data of a television broadcast program and/or data of a movie, which is stored in a digital versatile disk (DVD), etc., as appropriate, so as to make the present invention more understandable.

The present invention can be achieved through the use of visual attention to make various suggestions relating to the content data.

Here, the term "visual attention" denotes the degree of attention capturing of each region of an image, that is, the degree of sight-line concentration observed in each region of the image.

That is to say, a person tends to think that the person perceives 180-degree space facing the person of space spreading out before the person's eyes at a time. However, in actuality, the central visual field of a person corresponds to about four to ten-degree space. Consequently, a person perceives the entire 180-degree space facing the person by gradually moving the person's eyes intentionally or unintentionally. For example, when the person views the screen image of a television receiver (hereinafter referred to as a television screen), the person moves the person's sight line on the television screen with high speed based on displayed video. Further, for visual stimulation given to the user, the person does not necessarily views regions on a random basis, but views regions with some repeatability. Therefore, not each of the regions of the television screen captures attention, but the degree of attention capturing is varied among the regions of the television screen.

FIG. 1 illustrates the difference between the attention capturing degrees.

Figure 1B:
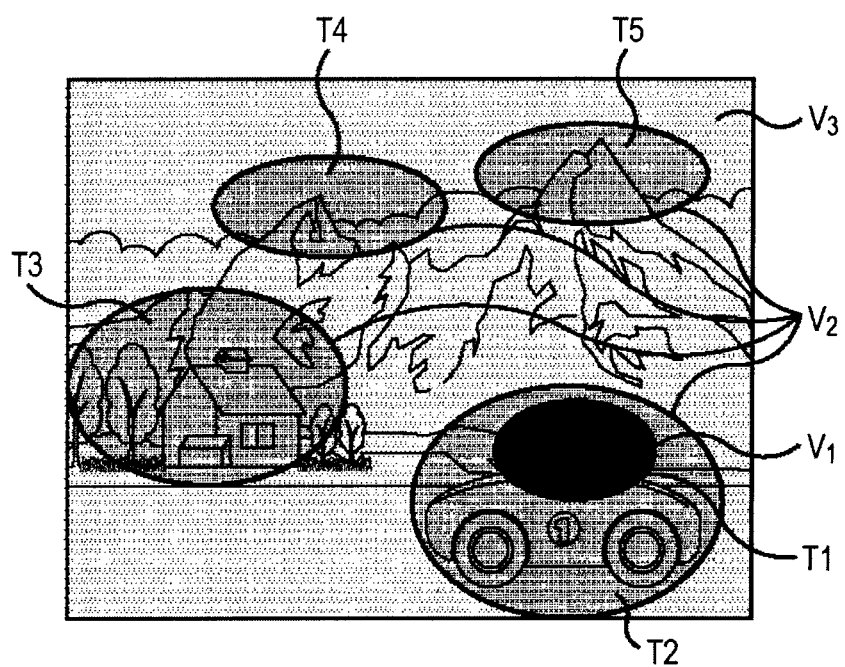
FIG. 1B is another diagram provided to illustrate the difference between the attention capturing degrees.

For example, when showing a still image of FIG. 1A to people, the greatest concentration of sight lines of the people is a region T1 showing a person in a green sports car, as shown in FIG. 1B. Subsequent to the region T1, the concentration of sight lines of the people is each of a region T2 surrounding the region T1, a region T3 showing a building, etc., and regions T4 and T5 showing the tops of mountains. Other regions hardly capture the sight lines of the people.

Thus, the same image includes a region where the sight lines of a person concentrate and that where the sight lines do not concentrate. Therefore, according to an embodiment of the present invention, the degree of sight line concentration of each of regions of an image, that is, the degree of attention capturing of each of the regions of the image is defined as the visual attention, and various suggestions relating to content data are made based on the visual attention.

More specifically, as exemplarily shown in FIG. 1B, a visual attention $V_1$ with a high value is assigned to the region T1, a visual attention $V_2$ with a medium value is assigned to each of the regions T2 to T5, and a visual attention $V_3$ with a low value is assigned to each of other regions. Thus, the visual attention may be varied among the regions, as is the case with the visual attentions $V_1$ to $V_3$, so that various suggestions relating to content data can be made based on conditions in which a user views the content data.

Hereinafter, embodiments of the present invention using the above-described visual attentions will be described with reference to FIG. 2 and beyond.

Embodiments of the Present Invention

[Exemplary Configuration of Content Suggesting System 1]

Figure 2:
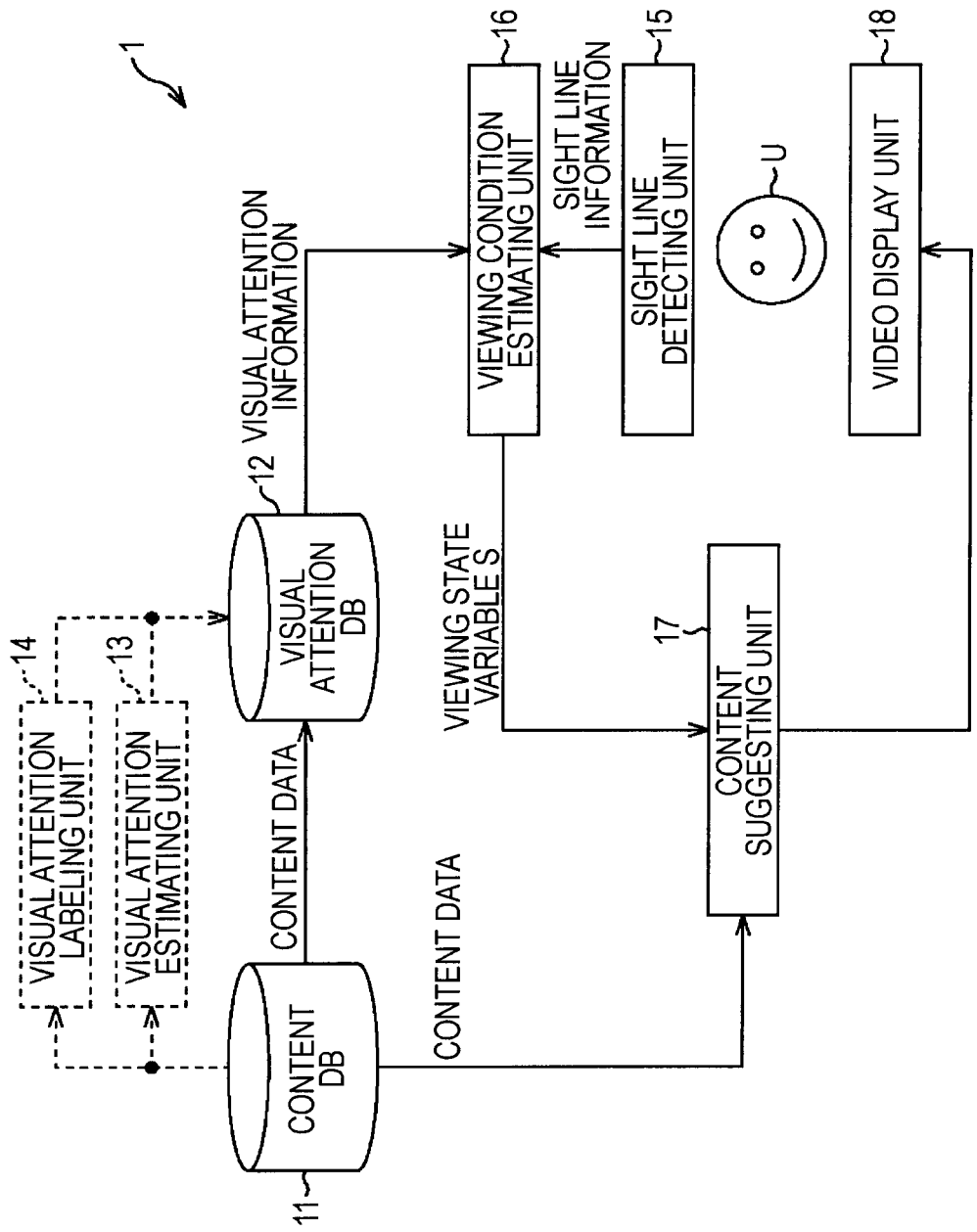
FIG. 2 is a functional block diagram showing an exemplary functional configuration of a content suggesting system provided as an information processing system according to an embodiment of the present invention.

FIG. 2 is a functional block diagram showing an exemplary functional configuration of a content suggesting system 1 exemplarily provided as an information processing system according to an embodiment of the present invention.

The content suggesting system 1 includes a content data base (DB) 11, a visual attention DB 12, a visual attention estimating unit 13, a visual attention labeling unit 14, a sight line detecting unit 15, a viewing condition estimating unit 16, a content suggesting unit 17, and a video display unit 18.

In this specification, the term "system" denotes an entire apparatus including a plurality of processing devices and/or processing units. Namely, the content suggesting system 1 may include at least one device. Further, without being limited to FIG. 2, each of functional blocks shown in each of functional block diagrams may be provided as software, hardware, or a combination of the software and the hardware.

The content DB 11 stores at least one content data item. Video information and information about content data, such as information about the broadcast date, the title, performers, and so forth (hereinafter referred to as metadata) are added to each of the at least one content data item. Each of the at least one content data item is output based on request data transmitted from the visual attention DB 12, the visual attention estimating unit 13, the visual attention labeling unit 14, and the content suggesting unit 17. Further, not the entire content data, but part thereof, such as the meta data alone is output from the content DB 11 as appropriate.

The visual attention DB 12 stores information about the visual attention observed at each time (hereinafter referred to as visual attention information) for each content data item stored in the content DB 11. In the above-described embodiment, for example, the video information corresponding to each content data item includes a plurality of frames. In that case, the visual attention information corresponding to each of the frames is stored in the visual attention DB 12. More specifically, a visual attention having a value of 0 or 1 is assigned to each of pixels included in each of the frames. In that case, the visual attention information corresponding to a predetermined frame becomes the aggregation of the values (0 or 1) indicating the visual attentions of the pixels. Here, values indicating the visual attentions of the individual pixels are determined to be pixel values so that image data including the pixel values (hereinafter referred to as visual attention image data) can be used as the visual attention information. Namely, in the above-described embodiment, the visual attention image data is adopted as the visual attention information of the corresponding frame.

In that case, for example, when the visual attention image data is data of a monochrome image where 0 is determined to be white and 1 is determined to be black, the color of a region approaches black as its visual attention is increased, and approaches white as its visual attention is decreased. More specifically, since the visual attention of a region or the like showing the face of the leading character and/or a main character, the face of an utterer, the region being included in the corresponding frame, is increased, the color of the region approaches black. On the other hand, the visual attention of a region or the like showing a performer and/or a background which does not relate to the story of the content data is decreased so that the color of the above-described region approaches white.

The visual attention will further be described with reference to FIGS. 3A and 3B.

Figure 3A:
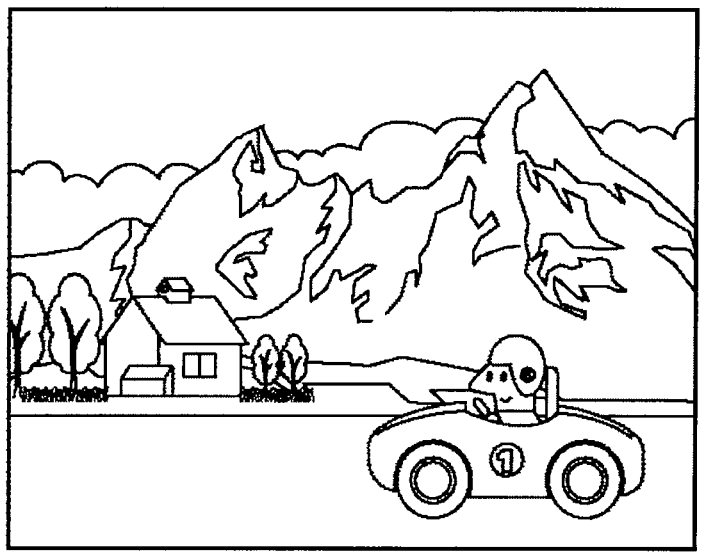
FIG. 3A is a diagram illustrating visual attentions.
Figure 3B:
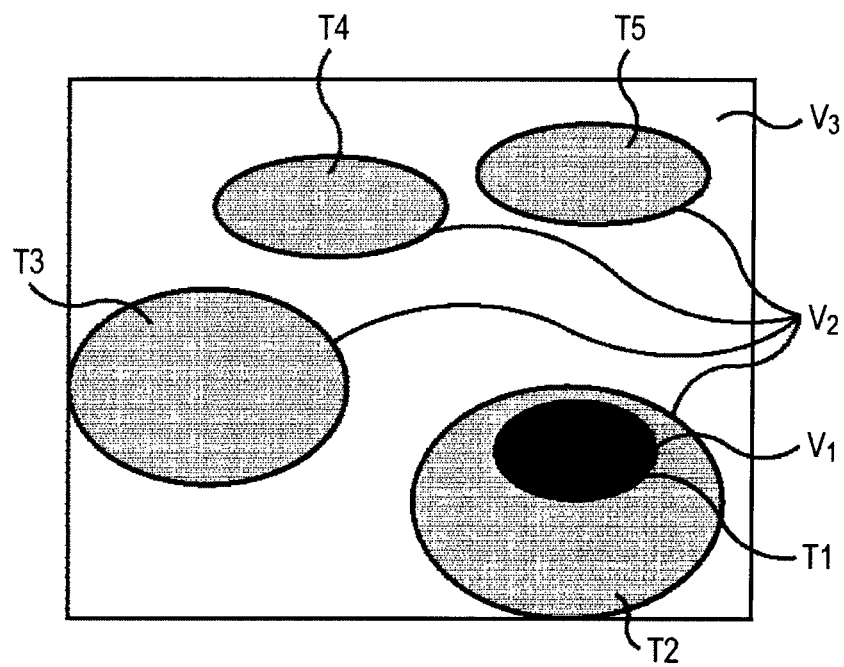
FIG. 3B is another diagram illustrating the visual attentions.

Each of FIGS. 3A and 3B illustrates the visual attention. FIG. 3A shows an exemplarily displayed predetermined frame of video information included in content data. FIG. 3B shows the visual attention information corresponding to the frame shown in FIG. 3A, that is, exemplarily displayed visual attention image data. Here, the exemplarily displayed frame shown in FIG. 3A is the same image as the still image shown in FIG. 1A, so as to make the present invention more understandable.

According to the exemplarily displayed visual attention information shown in FIG. 3B, the visual attention $V_1$ with a high value (e.g., 1) is assigned to the region T1 so that the color of the displayed region T1 is black, as described in FIG. 1B. Since the visual attention $V_2$ with a medium value (e.g., 0.5) is assigned to each of the regions T2 to T5, the color of each of the regions T2 to T5 is gray. Further, since the visual attention $V_3$ with a low value (e.g., 0) is assigned to the other region, the color thereof is white.

The exemplarily displayed frame shown in FIG. 3B is provided as exemplary visual attention information of the predetermined frame. Therefore, visual attention information different from the visual attention information of FIG. 3B is provided for a different frame, as a matter of course. Namely, the visual attention of a region is ceaselessly changed with the passage of time even though the region is spatially one and the same region. That is to say, the distribution of visual attentions assigned in a frame is changed with the passage of time as the scene changes.

Further, the method of generating the visual attention information is not particularly limited. For example, the method of generating the visual attention information based on a visual attention assigned through the visual attention estimating unit 13 shown in FIG. 2 can be adopted.

More specifically, the visual attention estimating unit 13 acquires predetermined content data from the content DB 11. The visual attention estimating unit 13 estimates and assigns a visual attention to each region for each of frames (each time) by analyzing the characteristics of each of the frames included in the predetermined content data. Consequently, the visual attention information of each of the frames is generated. Namely, in the above-described embodiment, the visual attention image data items corresponding to the individual frames are generated. Therefore, the visual attention estimating unit 13 stores data of the aggregation of the visual attention information items of the individual frames in the visual attention DB 12 as the visual attention information of the predetermined content data. Namely, in the above-described embodiment, video data including the visual attention image data items corresponding to the individual frames is stored in the visual attention DB 12 as the visual attention information of the predetermined content data. Each of content data items stored in the content DB 11 is subjected to the above-described series of processing procedures performed through the visual attention estimating unit 13 so that the visual attention information is generated for each of the content data items and stored in the visual attention DB 12.

Here, the method of estimating the visual attention, which is used by the visual attention estimating unit 13, is not particularly limited. For example, the method of estimating the visual attention by using an image recognition system including a face detector and/or a person detector, an object detector, and so forth can be adopted. In that case, it becomes possible to estimate and assign a visual attention with a high value to a region included in a frame, the region showing the image of a celebrity and/or the leading character, or an important item, for example.

The method of estimating the visual attention by using the characteristics of a human visual system can be adopted as the method of estimating the visual attention, which is used by the visual attention estimating unit 13. The human visual system has the property of perceiving a place with characteristics different from those of the surroundings as a "conspicuous place (=noticeable place=salient) and concentrating sight lines onto the place. The "conspicuous place" includes an independent red point, a black point shown on a white wall, a horizontal line shown across vertical lines, a place moving differently from the entire image screen, and so forth. It becomes possible to adopt the method of estimating onto which region a user concentrates sight lines for each of frames of given content data, and estimating and assigning a visual attention in accordance with the estimation result based on the characteristics of the human visual system. In addition to the above-described method, it becomes possible to adopt the method of estimating and assigning a visual attention with a higher value to the center region of a frame, because a person has the habit of viewing the center of a screen image with a frequency higher than that with which the person views the surroundings of the center.

Further, in addition to the method performed through the use of the visual attention estimating unit 13, the method of generating the visual attention information may include the method of generating the visual attention information based on a visual attention which is statistically obtained based on the sight lines of different users viewing content data. Still further, the method of generating the visual attention information may include the method of generating the visual attention information based on a visual attention assigned to each of frames in accordance with the content creator's intention in creating content data. When adopting the above-described methods, visual attentions assigned to the individual regions of each frame are known. Therefore, data of the known visual attentions can be stored in the visual attention labeling unit 14 in advance. Consequently, the visual attention labeling unit 14 can acquire predetermined content data from the content DB 11, read the visual attentions that had already been assigned to the individual frames included in the predetermined content data, and generate the visual attention information of the predetermined content data. The generated visual attention information is stored in the visual attention DB 12.

Thus, the visual attention information generation method itself is not particularly limited, and the visual attention estimating unit 13 and/or the visual attention labeling unit 14 is used in accordance with the generation method for adoption. Further, originally, the content suggesting system 1 itself does not necessarily generate the visual attention information so that existing visual attention information may be stored in the visual attention DB 12 in advance. Namely, the content suggesting system 1 may not include the visual attention estimating unit 13 and the visual attention labeling unit 14. In FIG. 2, therefore, the visual attention estimating unit 13 and the visual attention labeling unit 14 are indicated by dotted lines.

The sight line detecting unit 15 detects the sight line of a user U through, for example, an infrared camera, an ordinary charge-coupled-device (CCD) camera, and so forth pointed at an area around the eyes of the user U, and presents sight line information which is the detection result to the viewing condition estimating unit 16. In the above-described embodiment, for example, the sight line detecting unit 15 determines in which region of a frame image displayed on the video display unit 18 (and/or outside the video display unit 18) a sight line exists. The sight line detecting unit 15 presents information indicating the region showing the sight line of the user U to the viewing condition estimating unit 16 as the sight line information.

Further, the sight line detecting method itself performed by the sight line detecting unit 15 is not particularly limited so that the sight line detecting method is not limited to the above-described method. In addition to that, for example, the sight line detecting unit 15 may detect the sight line of the user U through an infrared camera, an ordinary CCD camera, and so forth fixed onto the head, for example, of the user U. Further, the sight line detecting unit 15 may detect the sight line of the user U through the use of an infrared camera, an ordinary CCD camera, and so forth fixed in an environment where the user U exists.

Figure 4:
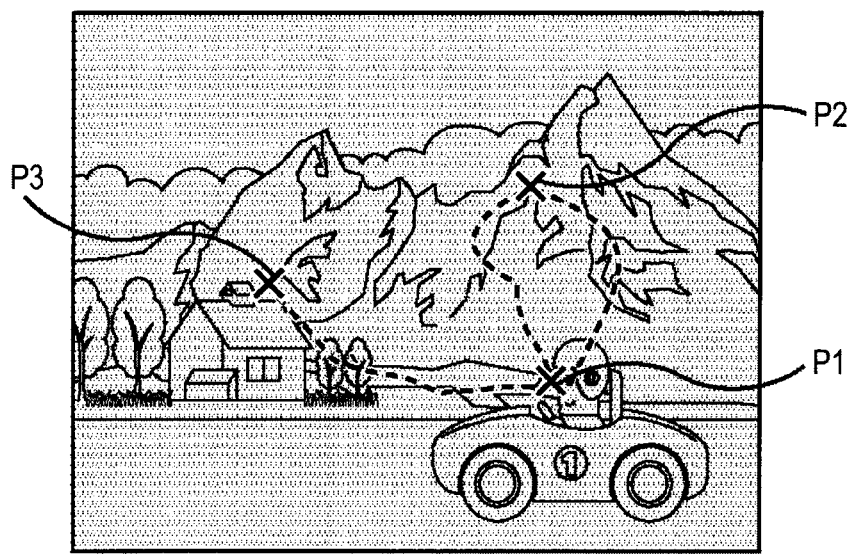
FIG. 4 shows exemplary sight line information.

FIG. 4 shows exemplary sight line information. In FIG. 4, points P1, P2, and P3 indicate a region including the sight line of the user U. Therefore, in the example shown in FIG. 4, information indicating the points P1 to P3 is presented to the sight line detecting unit 15 as the sight line information. Further, a dotted line linking the points P1 to P3 with one another indicates the locus of the sight line of the user U. The sight line information may include information about the locus of the user U's sight line. Further, the sight line information may be manually labeled in advance after content data is produced.

The viewing condition estimating unit 16 shown in FIG. 2 estimates the viewing condition of the user U by comparing the sight line information transmitted from the sight line detecting unit 15 to the visual attention information transmitted from the visual attention DB 12, and estimates the viewing state based on the estimation result.

When the user U views content data with concentration, the user U views a region with a high visual attention of each of frames included in the content data. Since the region with the high visual attention is ceaselessly changed to another in accordance with the changes of scenes, the sight line is changed in accordance with the changes of regions. On the other hand, when the user U views the content data without concentration, the user U does not necessarily view the region with the high visual attention of each of the frames included in the content data. Rather than viewing the region with the high visual attention, the user U often views a region with a low visual attention and/or outside the screen image. Therefore, for example, as the length of time that the user U views the region with the low visual attention during viewing the content data is increased (as the length of time that user U is in the above-described viewing condition is increased), it becomes possible to estimate that the user U does not view the content data without concentration, as the viewing state of the user U. Therefore, a variable is defined in the above-described embodiment, where the value of the variable is increased based on the total amount of time that the user U views the region with the low visual attention and/or outside the screen image and decreased based on the total amount of time that the user U views the region with the high visual attention. Hereinafter, the above-described variable is referred to as a viewing condition variable C. The details of the viewing condition variable C will be described later with reference to FIG. 6 and the like.

The viewing condition variable C is not limited to that exemplarily clarified in the above-described embodiment. For example, the viewing condition variable C may be a variable generated by adopting the distance between a region viewed by the user U and a region with the highest visual attention, which is shown in the screen image, as an indicator. Further, the viewing condition variable C may be a variable generated by adopting the visual attention of a region viewed by the user U as the indicator.

The viewing condition estimating unit 16 classifies the viewing states based on the magnitude of the value of the viewing condition variable C so as to estimate the viewing state of the user U. Namely, in the above-described embodiment, a variable classified based on the magnitude of the viewing condition variable C is defined as a variable indicating the viewing state of the user U. Hereinafter, the above-described variable is referred to as a viewing state variable S. More specifically, in the above-described embodiment, each of values indicating the following six types of viewing states is defined as a possible value of the viewing state variable S. Namely, values indicating the individual six types of viewing states including WATCHING (the state where the user U views the content data), BORINGL1 (the state where the user U is starting to get bored), BORINGL2 (the state where the user U is bored), NOT WATCHING (the state where the user U is not viewing the content data), SLEEPING (the state where the user U is sleeping), and AWAY (the state where the user U is not in front of a video display device). As the value of the viewing condition variable C is increased, the values indicating the individual states are determined to be the viewing state variable S in the order of the states WATCHING, BORINGL1, BORINGL2, NOT WATCHING, SLEEPING, and AWAY. The details of the values indicating the individual six types of viewing states will be described later.

The possible value of the viewing state variable S is not particularly limited to the above-described six types of values as a matter of course. For example, each of values indicating the various types of viewing states including the states BLINK (wink), TEMPORAL_AWAY (taking eyes off for a very short time), and so forth can be adopted as the viewing state variable S. Further, the viewing state is grasped not as the above-described discrete state, but as a state which is changed continuously so that the viewing state variable S may have an analog value in place of a digital value.

The viewing condition estimating unit 16 determines a value appropriate for the current viewing state as the above-described variable S indicating the viewing state of the user U, and transmits data of the determined value to the content suggesting unit 17. The further details of the viewing state variable S will be described later with reference to FIG. 7 and the like.

The content suggesting unit 17 makes various types of suggestions for content data appropriate for the user U based on the viewing-state-variable-S data transmitted from the viewing condition estimating unit 16 and each of content data items that are stored in the content DB 11.

For example, the content suggesting unit 17 determines that the user U does not view content data without concentration based on the viewing state variable S.

In that case, the content suggesting unit 17 can suggest that the user U discontinue and/or stop viewing the content data. If the user U accepts the above-described suggestion, the content suggesting unit 17 instructs the video display unit 18 to discontinue and/or stop displaying the content data. The video display unit 18 discontinues and/or stops displaying the content data based on the above-described instruction.

Further, for example, the content suggesting unit 17 can select new content data which may raise the user U's interest from among the content data items that are stored in the content DB 11, and suggest that the user U change the viewing subject from the current content data to the new content data. When the user U accepts the above-described suggestion, the content suggesting unit 17 acquires the new content data from the content DB 11, and presents the new content data to the video display unit 18. The video display unit 18 displays each of frame images included in the new content data so that the user U can view the new content data.

Thus, the video display unit 18 can display various types of content data items under the control of the content suggesting unit 17. The video display unit 18 may include a television receiver, the monitor of a personal computer, the display unit of a mobile phone, and so forth.

[Content Suggestion Processing]

Figure 5:
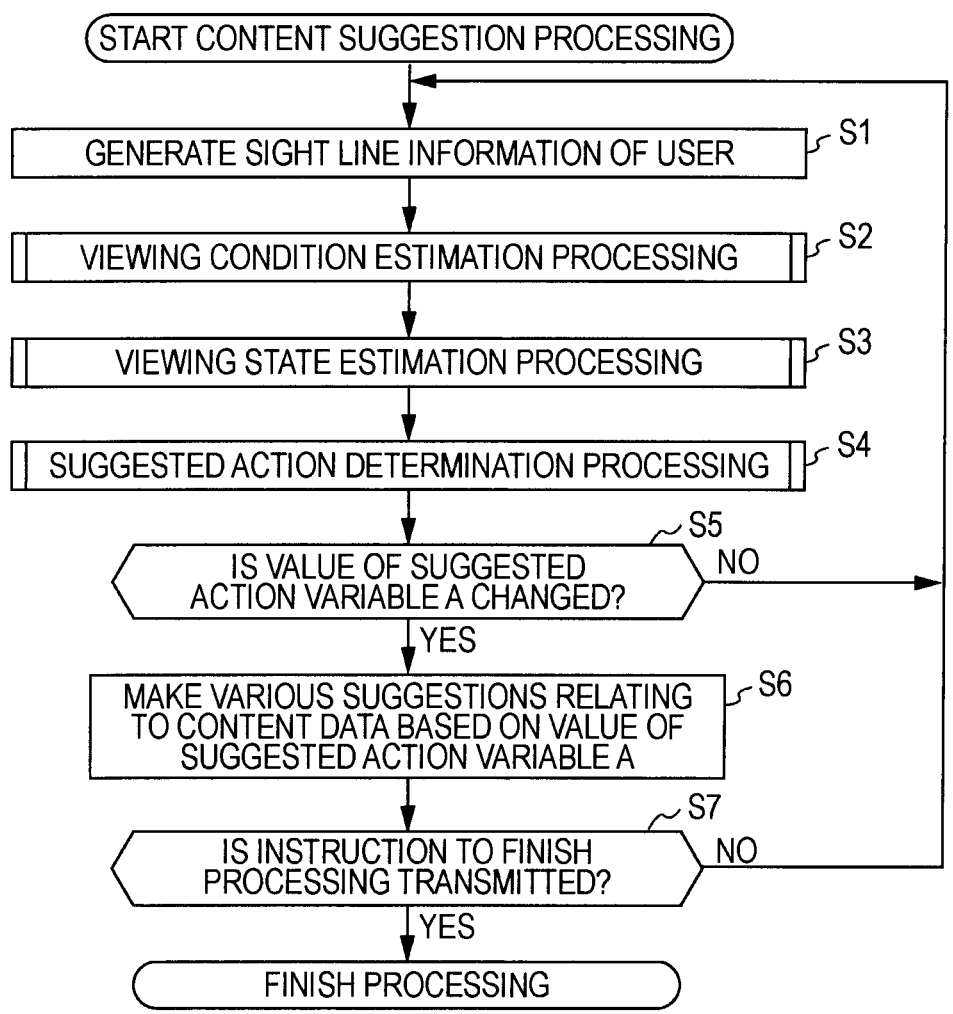
FIG. 5 is a flowchart illustrating exemplary content suggestion processing performed through the content suggesting system shown in FIG. 2.

FIG. 5 is a flowchart showing an exemplary series of processing procedures performed to make various types of suggestions for content data (hereinafter referred to as content suggestion processing) of processing procedures executed through the content suggesting system 1 configured as shown in FIG. 2.

At step S1, the sight line detecting unit 15 generates information about the sight line of the user U. The sight line information of the user U is presented to the viewing condition estimating unit 16. Consequently, the processing advances to step S2.

At step S2, the viewing condition estimating unit 16 calculates the value of the above-described viewing condition variable C based on the sight line information of the user U and the visual attention information. The above-described processing performed at step S2 is hereinafter referred to as viewing condition estimation processing. Example details of the viewing condition estimation processing will be described later with reference to FIG. 6.

At step S3, the viewing condition estimating unit 16 estimates and calculates the value of the above-described viewing state variable S based on the value of the viewing condition variable C. The above-described processing performed at step S3 is hereinafter referred to as viewing state estimation processing. Exemplary details of the viewing state estimation processing will be described later with reference to FIGS. 7 and 8. Data of the viewing state variable S is presented to the content suggesting unit 17 so that the processing advances to step S4.

At step S4, the content suggesting unit 17 determines various types of suggested actions relating to the content data based on the value of the viewing state variable S. The suggested action denotes the user's action suggested by the content suggesting system 1 based on the viewing condition of the user and/or details of processing executed by the content suggesting unit 17 itself in place of the user's action. For example, if it is determined that the user is bored with displayed content data, the content suggesting system 1 can determine stopping and/or discontinuing the displayed content data, or displaying different content data to be the suggested action.

More specifically, in the above-described embodiment, variables classified based on the value of the viewing state variable S are exemplarily defined as variables indicating the various types of suggested actions relating to the content data. Hereinafter, each of the above-described variables is referred to as a suggested action variable A. The content suggesting unit 17 calculates the value of the suggested action variable A based on the value of the viewing state variable S. The above-described processing performed at step S4 is hereinafter referred to as suggested action determination processing. Exemplary details of the suggested action determination processing will be described later with reference to FIGS. 9 and 10.

At step S5, the content suggesting unit 17 determines whether or not the value of the suggested action variable A is changed.

If the value of the suggested action variable A is not changed, it is determined that the answer is NO at step S5, the processing returns to step S1, and the processing corresponding to step S1 and afterward is performed again. Namely, loop processing including the processing procedures performed at steps S1 to S5 is repeated until the value of the suggested action variable A is changed. During the loop processing, the content data corresponding to the current value of the suggested action variable A is suggested continuously.

After that, each time the loop processing corresponding to steps S1 to S5 is repeated, the value of the viewing condition variable C is updated. Then, the value of the viewing state variable S is appropriately changed based on the updated value of the viewing condition variable C. As a result, when the value of the suggested action variable A is changed, it is determined that the answer is YES at step S5 so that the processing advances to step S6.

At step S6, the content suggesting unit 17 makes various types of suggestions relating to the content data based on the value of the suggested action variable A. Namely, in the above-described embodiment, at least one predetermined type of suggested action relating to the content data is associated with a predetermined value and/or a predetermined range of the suggested action variable A in advance, for example. Therefore, the content suggesting unit 17 recognizes the action associated with the value of the suggested action variable A, suggests that the user U take the suggested action, or executes the suggested action by the content suggesting unit 17 itself in place of the user U's action. Here, the specific type of the suggested action will be described later with reference to FIG. 9 and beyond.

At step S7, the content suggesting unit 17 determines whether or not an instruction to finish the processing is transmitted.

If the instruction to finish the processing is not issued, it is determined that the answer at step S7 is NO, the processing returns to step S1, and the processing from S1 and beyond is repeated. That is to say, loop processing including the processing procedures performed at steps S1 to S7 is repeated until the instruction to finish the processing is issued.

Namely, the loop processing corresponding to steps S1 to S7 is repeatedly executed in a predetermined cycle (of a second, for example). Consequently, the value of the viewing condition variable C is ceaselessly changed in a predetermined cycle (of a second, for example). Further, when the viewing condition of the user U is changed and the value of the viewing condition variable C is changed beyond a predetermined limit as a result, the value of the viewing state variable S is changed and the value of the suggested action variable A is changed eventually. Consequently, the type of the suggested action performed by the content suggesting unit 17 is changed. Thus, various types of suggested actions relating to the content data are suggested based on the content viewing condition of the user U.

When the instruction to finish the processing is issued after that, it is determined that the answer at step S7 is YES and the content suggestion processing is finished.

Hereinafter, of the content suggestion processing, the viewing condition estimation processing performed at step S2, the viewing state estimation processing performed at step S3, and the suggested action determination processing performed at step S4 will be individually described in that order.

[Viewing Condition Estimation Processing]

Figure 6:
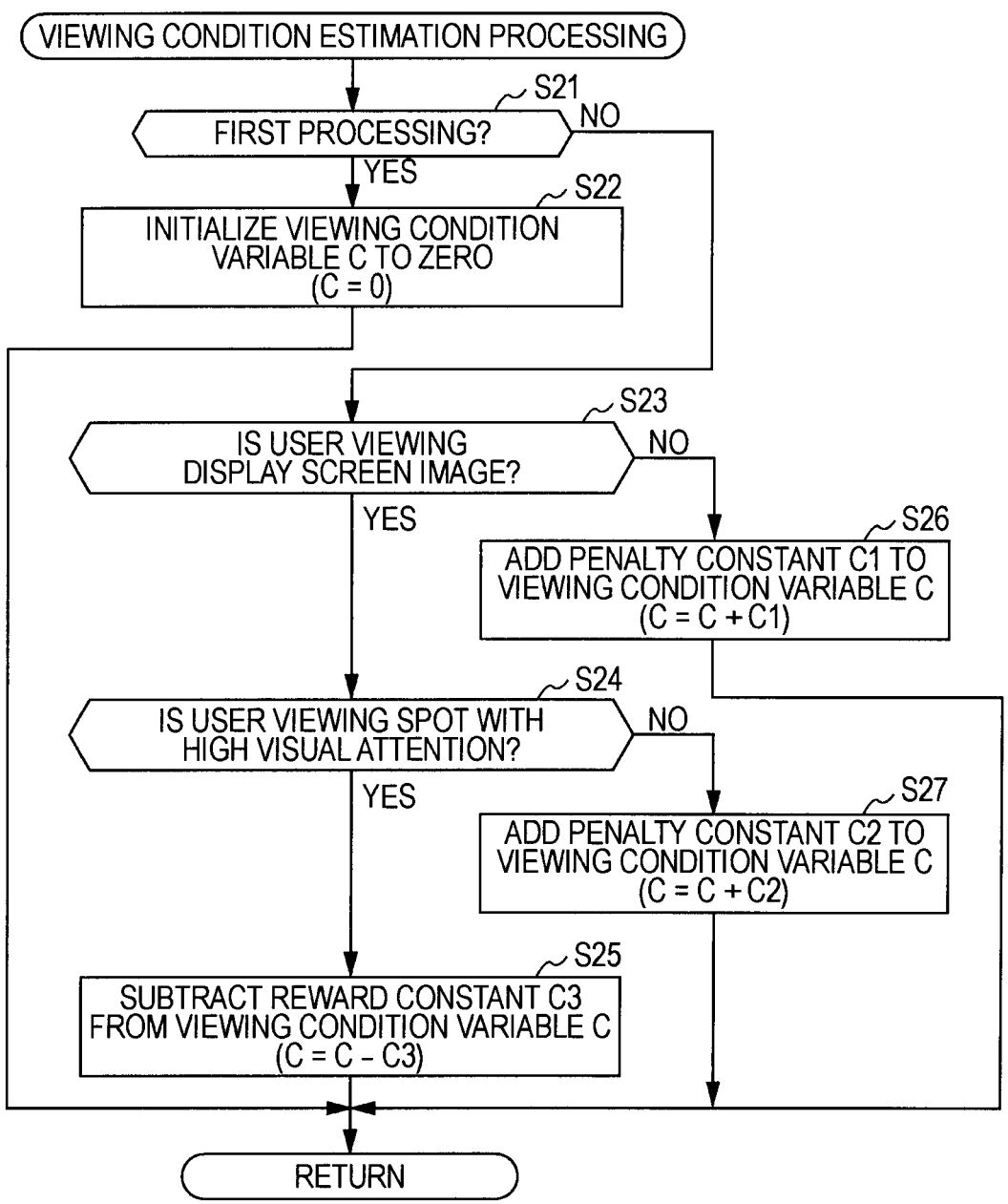
FIG. 6 is a flowchart illustrating exemplary viewing condition estimation processing performed at step S2 shown in FIG. 5 in detail.

FIG. 6 is a flowchart illustrating exemplary details of the viewing condition estimation processing performed at step S2 shown in FIG. 5.

At step S21, the viewing condition estimating unit 16 determines whether or not the viewing condition estimation processing is the first processing.

If it is determined that the viewing condition estimation processing is not the first processing, the processing advances to step S23.

On the other hand, if the viewing condition estimation processing is the first processing, it is determined that the answer at step S21 is YES and the processing advances to step S22.

At step S22, the viewing condition estimating unit 16 initializes the value of the viewing condition variable C to zero (C=0). Consequently, the viewing condition estimation processing is finished, namely, the processing corresponding to step S2 shown in FIG. 5 is finished and the processing advances to viewing state estimation processing performed at step S3. In that case, the value of the viewing condition variable C is zero and the viewing state estimation processing is executed at step S3.

On the other hand, if the viewing condition estimation processing is the second processing or later processing, it is determined that the answer at step S21 is NO and the processing advances to step S23. Namely, the value calculated through the previous viewing condition estimation processing is used as the value of the viewing condition variable C, and a series of processing procedures from step S23 and beyond is executed.

At step S23, the viewing condition estimating unit 16 determines whether or not the user U views the display screen image.

If the user U does not view the display screen image, it is determined that the answer at step S23 is NO so that the processing advances to step S26. At step S26, the viewing condition estimating unit 16 adds a penalty constant C1 to the original value of the viewing condition variable C, and sets the value obtained through the above-described addition as a new value of the viewing condition variable C (C=C+C1). That is to say, the value of the viewing condition variable C is updated so that the value is increased by as much as the penalty constant C1.

On the contrary, when the user U views the display screen image, it is determined that the answer is YES at step S23, and the processing advances to step S24.

At step S24, the viewing condition estimating unit 16 determines whether or not the user U is viewing a spot with a high visual attention. For example, the viewing condition estimating unit 16 determines whether or not the value of the visual attention of a spot where the sight line of the user exists is equal to or larger than a threshold value based on sight line information transmitted from the sight line detecting unit 15 just before making the determination. If the value of the visual attention is equal to or larger than threshold value, it is determined that the user is viewing the spot with the high visual attention. If the value of the visual attention is smaller than the threshold value, it is determined that the user U is not viewing the spot with the high visual attention.

If the user U does not view the spot with the high visual attention, it is determined that the answer is NO at step S24, and the processing advances to step S27 where the viewing condition estimating unit 16 adds a penalty constant C2 to the original value of the viewing condition variable C, and sets the value obtained through the addition as a new value of the viewing condition variable C (C=C+C2). That is to say, the value of the viewing condition variable C is updated so that the value is increased by as much as the penalty constant C2.

On the contrary, when the user U is viewing the spot with the high visual attention, it is determined that the answer is YES at step S24 so that the processing advances to step S25 where the viewing condition estimating unit 16 subtracts a reward constant C3 from the original value of the viewing condition variable C, and sets a value obtained through the subtraction as a new value of the viewing condition variable C (C=C−C3). That is to say, the value of the viewing condition variable C is updated so that the value is decreased by as much as the reward constant C3.

Consequently, the viewing condition estimation processing performed through the viewing condition estimation unit 16 is finished. Each of the penalty constants C1 and C2 is a constant satisfying the expression C1>=C2>0. Further, the reward constant C3 is a constant satisfying the expression C>C3.

The viewing condition variable C indicates a degree in which the user U views the content data with concentration. In the above-descried embodiment, however, the concentration with which the user U views the content data is increased as the value of the viewing condition variable C is decreased. In other words, the concentration with which the user U views the content data is decreased as the value of the viewing condition variable C is increased. Therefore, the viewing condition of the user is observed in a predetermined cycle and the penalty constant C1 is added to the viewing condition variable C each time when the user U does not view the display screen image. Further, the penalty constant C2 is added to the viewing condition variable C each time when the user U is not viewing the spot with the high visual attention, so that the value of the viewing condition variable C is updated in an increasing direction. Further, as for a degree in which the user U views the content data without concentration, it becomes possible to recognize that a degree attained when the user U does not view the display screen image is higher than that attained when the user U is not viewing a spot with a high visual attention (on condition that the user U is viewing at least the display screen image). In the above-described embodiment, therefore, the penalty constant C1 is set to a value higher than that of the penalty constant C2.

Further, if the viewing condition variable C is updated only through the addition of the penalty constant C1 and/or the penalty constant C2 during the viewing condition estimation processing, the value of the viewing condition variable C keeps increasing each time the viewing condition estimation processing is repeated even though the user U takes an interest in the content data again and starts viewing the content data with concentration again. Therefore, when the user U views the spot with the high visual attention, it is determined that the user U starts viewing the content data with concentration again and the value of the viewing condition variable C is decreased through the use of the reward constant C3.

When the above-described viewing condition estimation processing shown in FIG. 6 is finished, the processing corresponding to step S2 shown in FIG. 5 is finished so that the processing advances to the viewing state estimation processing corresponding to step S3.

[Viewing State Estimation Processing]

Hereinafter, exemplary details of the viewing state estimation processing will be described with reference to FIGS. 7 and 8.

FIG. 7 shows a table showing the relationships between three types of data items including the threshold value of the viewing condition variable C, the viewing state, and the viewing state variable S.

In the above-described embodiment, the viewing condition estimating unit 16 estimates and calculates the value of the viewing state variable S based on the table show in FIG. 7.

Namely, as shown in FIG. 7, six types of viewing states are defined based on a possible range of the viewing state variable C, and a value uniquely indicating each of the six types of viewing states is provided as the viewing state variable S.

More specifically, a viewing state attained when the value of the viewing state variable C falls within the range of from zero to less than a threshold value C_BORINGL1 (0<=C<C_BORINGL1) is determined to be WATCHING (the state where the user U is viewing the content data). A value S_1 indicating WATCHING is added to WATCHING (the state where the user U is viewing the content data) as the viewing state variable S. Namely, the viewing condition estimating unit 16 estimates and calculates the value S_1 as the viewing state variable S when the calculation result of the viewing condition estimation processing performed at the next previous step or step S2, that is, the value of the viewing condition variable C is at least zero and less than the threshold value C_BORINGL1.

A viewing state attained when the value of the viewing condition variable C falls within the range of from the threshold value C_BORINGL1 to less than a threshold value C_BORINGL2 (C_BORINGL1<=C<C_BORINGL2) is determined to be BORINGL1 (the state where the user U is starting to get bored). A value S_2 indicating BORINGL1 is added to BORINGL1 (the state where the user U is starting to get bored) as the viewing state variable S. Namely, the viewing condition estimating unit 16 estimates and calculates the value S_2 as the viewing state variable S when the calculation result of the viewing condition estimation processing performed at the next previous step or step S2, that is, the value of the viewing condition variable C is at least the threshold value C_BORINGL1 and less than the threshold value C_BORINGL2.

A viewing state attained when the value of the viewing condition variable C falls within the range of from the threshold value C_BORINGL2 to less than a threshold value C_NOT_WATCHING (C_BORINGL2<=C<C_NOT_WATCHING) is determined to be BORINGL2 (the state where the user U is bored). A value S_3 indicating BORINGL2 is added to BORINGL2 (the state where the user U is bored) as the viewing state variable S. Namely, the viewing condition estimating unit 16 estimates and calculates the value S_3 as the viewing state variable S when the calculation result of the viewing condition estimation processing performed at the next previous step or step S2, that is, the value of the viewing condition variable C is at least the threshold value C_BORINGL2 and less than the threshold value C_NOT_WATCHING.

A viewing state attained when the value of the viewing condition variable C falls within the range of from the threshold value C_NOT_WATCHING to less than a threshold value C_SLEEPING (C_NOT_WATCHING<=C<C_SLEEPING) is determined to be NOT WATCHING (the state where the user U is not viewing the content data). A value S_4 indicating NOT_WATCHING is added to NOT WATCHING (the state where the user U is not viewing the content data) as the viewing state variable S. Namely, the viewing condition estimating unit 16 estimates and calculates the value S_4 as the viewing state variable S when the calculation result of the viewing condition estimation processing performed at the next previous step or step S2, that is, the value of the viewing condition variable C is at least the threshold value C_NOT_WATCHING and less than the threshold value C_SLEEPING.

A viewing state attained when the value of the viewing condition variable C falls within the range of from the threshold value C_SLEEPING to less than a threshold value C_AWAY (C_SLEEPING<=C<C_AWAY) is determined to be SLEEPING (the state where the user U is sleeping). A value S_5 indicating SLEEPING is added to SLEEPING (the state where the user U is sleeping) as the viewing state variable S. Namely, the viewing condition estimating unit 16 estimates and calculates the value S_5 as the viewing state variable S when the calculation result of the viewing condition estimation processing performed at the next previous step or step S2, that is, the value of the viewing condition variable C is at least the threshold value C_SLEEPING and less than the threshold value C_AWAY.

A viewing state attained when the value of the viewing condition variable C is equal to or larger than the threshold value C_AWAY (C_AWAY<=C) is determined to be AWAY (the state where the user U is not in front of the video display device). A value S_6 indicating AWAY is added to AWAY (the state where the user U is not in front of the video display device) as the viewing state variable S. Namely, the viewing condition estimating unit 16 estimates and calculates the value S_6 as the viewing state variable S when the calculation result of the viewing condition estimation processing performed at the next previous step or step S2, that is, the value of the viewing condition variable C is equal to or larger than the threshold value C_AWAY.

Figure 8:
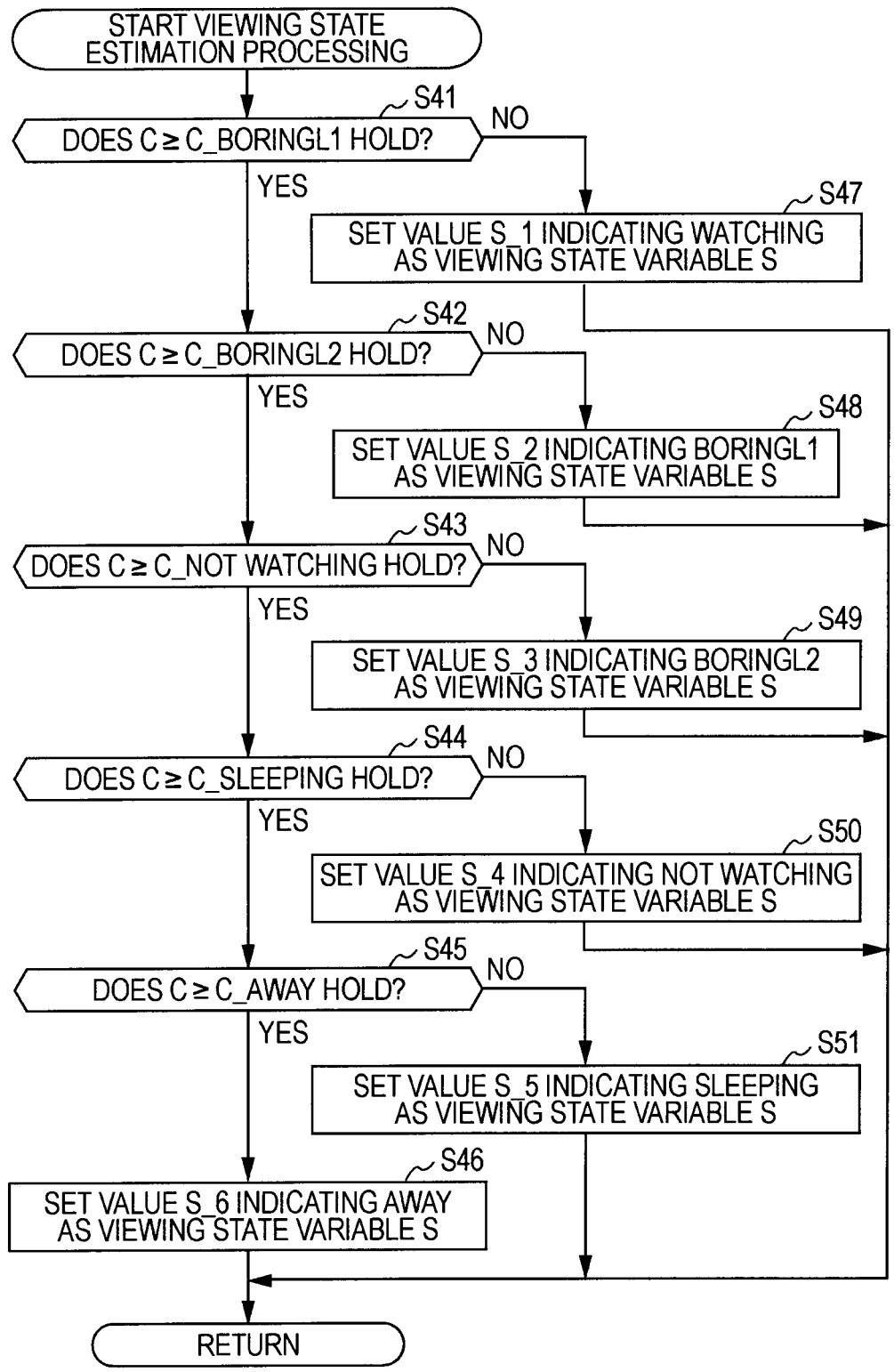
FIG. 8 is a flowchart illustrating exemplary viewing state estimation processing performed at step S3 shown in FIG. 5 in detail, which is the example corresponding to that of FIG. 7.

FIG. 8 is a flowchart illustrating exemplary details of the viewing state estimation processing performed at step S3 shown in FIG. 5, that is, viewing state estimation processing performed based on the table shown in FIG. 7.

At step S41, the viewing condition estimating unit 16 determines whether or not the value of the viewing condition variable C is equal to or larger than the threshold value C_BORINGL1 (whether or not the expression C>=C_BORINGL1 holds).

When the value of the viewing condition variable C falls within the range of from zero to less than the threshold value C_BORINGL1 (0<=C<C_BORINGL1), it is determined that the answer at step S41 is NO and the processing advances to step S47.

At step S47, the viewing condition estimating unit 16 sets the value S_1 indicating WATCHING as the viewing state variable S. That is to say, the value S_1 indicating WATCHING is estimated and calculated as the viewing state variable S and the viewing state estimation processing is finished. Consequently, the processing advances from step S3 to step S4 as shown in FIG. 5.

On the contrary, when the value of the viewing condition variable C is equal to or larger than the threshold value C_BORINGL1, it is determined that the answer at step S41 is YES and the processing advances to step S42.

At step S42, the viewing condition estimating unit 16 determines whether or not the value of the viewing condition variable C is equal to or larger than the threshold value C_BORINGL2 (whether or not the expression C>=C_BORINGL2 holds).

When the value of the viewing condition variable C falls within the range of from the threshold value C_BORINGL1 to less than the threshold value C_BORINGL2 (C_BORINGL1<=C<C_BORINGL2), it is determined that the answer at step S42 is NO and the processing advances to step S48.

At step S48, the viewing condition estimating unit 16 sets the value S_2 indicating BORINGL1 as the viewing state variable S. That is to say, the value S_2 indicating BORINGL1 is estimated and calculated as the viewing state variable S and the viewing state estimation processing is finished. Consequently, the processing advances from step S3 to step S4 as shown in FIG. 5.

On the contrary, when the value of the viewing condition variable C is equal to or larger than the threshold value C_BORINGL2, it is determined that the answer at step S42 is YES and the processing advances to step S43.

At step S43, the viewing condition estimating unit 16 determines whether or not the value of the viewing condition variable C is equal to or larger than the threshold value C_NOT_WATCHING (whether or not the expression C>=C_NOT_WATCHING holds).

When the value of the viewing condition variable C falls within the range of from the threshold value C_BORINGL2 to less than the threshold value C_NOT_WATCHING (C_BORINGL2<=C<C_NOT_WATCHING), it is determined that the answer at step S43 is NO and the processing advances to step S49.

At step S49, the viewing condition estimating unit 16 sets the value S_3 indicating BORINGL2 as the viewing state variable S. That is to say, the value S_3 indicating BORINGL2 is estimated and calculated as the viewing state variable S and the viewing state estimation processing is finished. Consequently, the processing advances from step S3 to step S4 as shown in FIG. 5.

On the contrary, when the value of the viewing condition variable C is equal to or larger than the threshold value C_NOT_WATCHING, it is determined that the answer at step S43 is YES and the processing advances to step S44.

At step S44, the viewing condition estimating unit 16 determines whether or not the value of the viewing condition variable C is equal to or larger than the threshold value C_SLEEPING (whether or not the expression C>=C_SLEEPING holds).

When the value of the viewing condition variable C falls within the range of from the threshold value C_NOT_WATCHING to less than the threshold value C_SLEEPING (C_NOT_WATCHING<=C<C_SLEEPING), it is determined that the answer at step S44 is NO and the processing advances to step S50.

At step S50, the viewing condition estimating unit 16 sets the value S_4 indicating NOT_WATCHING as the viewing state variable S. That is to say, the value S_4 indicating NOT_WATCHING is estimated and calculated as the viewing state variable S and the viewing state estimation processing is finished. Consequently, the processing advances from step S3 to step S4 as shown in FIG. 5.

On the contrary, when the value of the viewing condition variable C is equal to or larger than the threshold value C_SLEEPING, it is determined that the answer at step S44 is YES and the processing advances to step S45.

At step S45, the viewing condition estimating unit 16 determines whether or not the value of the viewing condition variable C is equal to or larger than the threshold value C_AWAY (whether or not the expression C>=C_AWAY holds).

When the value of the viewing condition variable C falls within the range of from the threshold value C_SLEEPING to less than the threshold value C_AWAY (C_SLEEPING<=C<C_AWAY), it is determined that the answer at step S45 is NO and the processing advances to step S51.

At step S51, the viewing condition estimating unit 16 sets the value S_5 indicating SLEEPING as the viewing state variable S. That is to say, the value S_5 indicating SLEEPING is estimated and calculated as the viewing state variable S and the viewing state estimation processing is finished. Consequently, the processing advances from step S3 to step S4 as shown in FIG. 5.

On the contrary, when the value of the viewing condition variable C is equal to or larger than the threshold value C_AWAY, it is determined that the answer at step S45 is YES and the processing advances to step S46.

At step S46, the viewing condition estimating unit 16 sets the value S_6 indicating AWAY as the viewing state variable S. That is to say, the value S_6 indicating AWAY is estimated and calculated as the viewing state variable S and the viewing state estimation processing is finished. Consequently, the processing advances from step S3 to step S4 as shown in FIG. 5.

Consequently, the viewing state estimation processing performed through the viewing condition estimation unit 16 is finished and the processing corresponding to step S3 shown in FIG. 5 is finished. Accordingly, the processing advances from step S3 to step S4 corresponding to the suggested action determination processing as shown in FIG. 5.

[Suggested Action Determination Processing]

Hereinafter, exemplary details of the suggested action determination processing will be described with reference to FIGS. 9 and 10.

FIG. 9 shows a table showing the relationships between three types of data items indicating the viewing state variable S, the suggested action, and the suggested action variable A.

In the above-described embodiment, the content suggesting unit 17 calculates the value of the suggested action variable A based on the table shown in FIG. 9.

Namely, as shown in FIG. 9, six types of suggested actions are defined based on the value of the viewing state variable S, and a value uniquely indicating each of the six types of suggested actions is provided as the suggested action variable A.

More specifically, a suggested action performed when the viewing state variable S is the value S_1 (S=S_1) and/or an error value is determined to be DO NOTHING. A value A1 indicating DO NOTHING is added to data of the action DO NOTHING as the suggested action variable A. Therefore, the content suggesting unit 17 calculates the value A1 as the suggested action variable A when the calculation result of the viewing state estimation processing performed at the next previous step or step S3, that is, the viewing state variable S is the value S_1. Further, in the case where the value of the viewing state variable S is the error value, the content suggesting unit 17 calculates the value A1 as the suggested action variable A. The case where the value of the variable S is the error value denotes the case where the viewing state variable S has a value different from each of the values S_1 to S_6.

A suggested action performed when the viewing state variable S is the value S_2 (S=S_2) is an action VERIFY. A value A2 indicating the action VERIFY is added to data of the action VERIFY as the suggested action variable A. Therefore, the content suggesting unit 17 calculates the value A2 as the suggested action variable A when the calculation result of the viewing state estimation processing performed at the next previous step or step S3, that is, the viewing state variable S is the value S_2.

A suggested action performed when the viewing state variable S is the value S_3 (S=S_3) is an action ACTION1. A value A3 indicating the action ACTION1 is added to data of the action ACTION1 as the suggested action variable A. Therefore, the content suggesting unit 17 calculates the value A3 as the suggested action variable A when the calculation result of the viewing state estimation processing performed at the next previous step or step S3, that is, the viewing state variable S is the value S_3.

A suggested action performed when the viewing state variable S is the value S_4 (S=S_4) is an action ACTION2. A value A4 indicating the action ACTION2 is added to data of the action ACTION2 as the suggested action variable A. Therefore, the content suggesting unit 17 calculates the value A4 as the suggested action variable A when the calculation result of the viewing state estimation processing performed at the next previous step or step S3, that is, the viewing state variable S is the value S_4.

A suggested action performed when the viewing state variable S is the value S_5 (S=S_5) is an action ACTION3. A value A5 indicating the action ACTION3 is added to data of the action ACTION3 as the suggested action variable A. Therefore, the content suggesting unit 17 calculates the value A5 as the suggested action variable A when the calculation result of the viewing state estimation processing performed at the next previous step or step S3, that is, the value of the viewing state variable S is the value S_5. Although the suggested action ACTION defined in the above-described embodiment includes the actions ACTION1 to ACTION3, the type of the suggested action ACTION is not particularly limited.

A suggested action performed when the viewing state variable S is the value S_6 (S=S_6) is an action TURN OFF (turn off the power). A value A6 indicating the action TURN OFF is added to data of the action TURN OFF as the suggested action variable A. Therefore, the content suggesting unit 17 calculates the value A6 as the suggested action variable A when the calculation result of the viewing state estimation processing performed at the next previous step or step S3, that is, the viewing state variable S is the value S_6.

Figure 10:
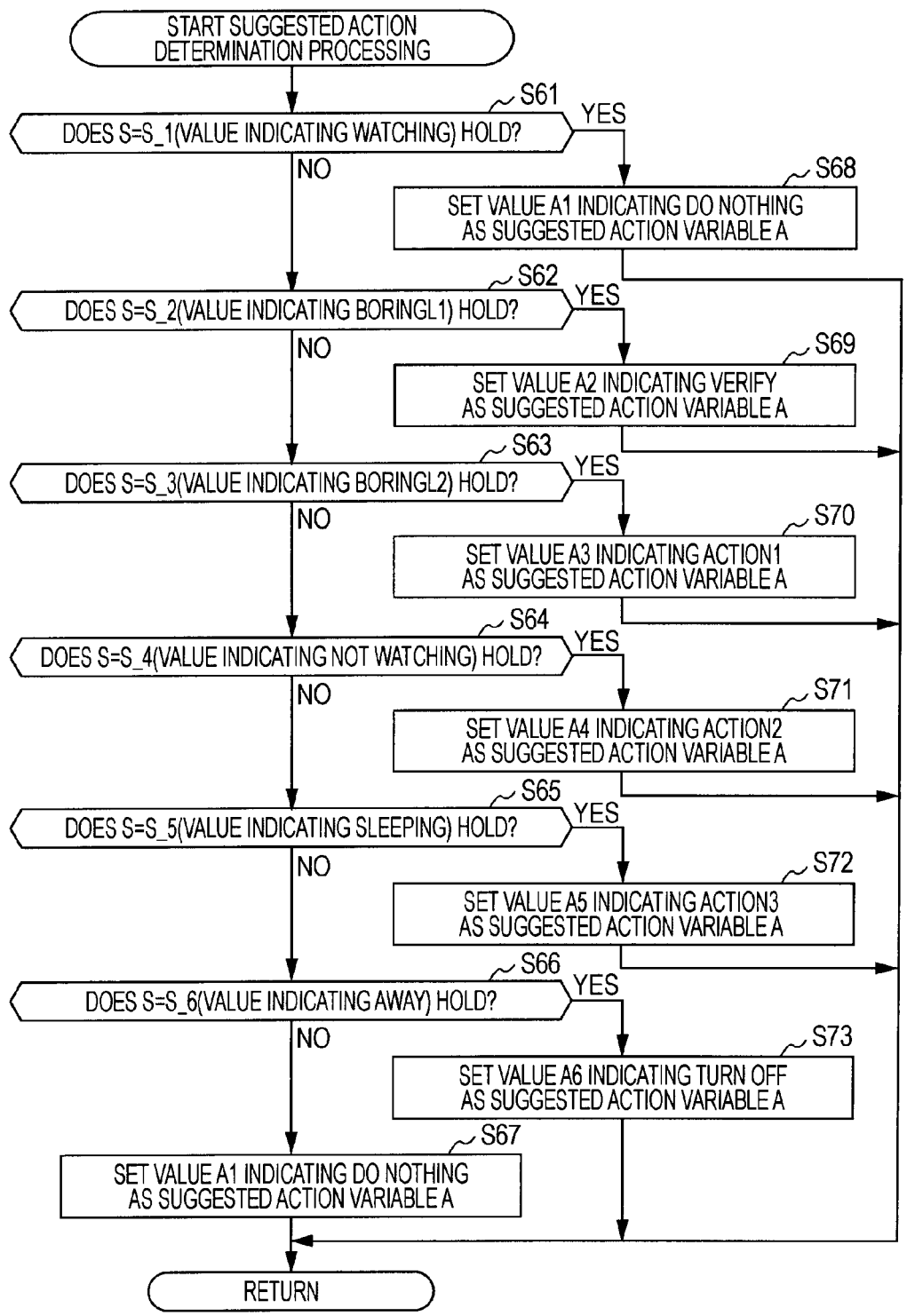
FIG. 10 is a flowchart illustrating the exemplary suggested action determination processing performed at step S4 shown in FIG. 5 in detail, which is the example corresponding to that of FIG. 9.

FIG. 10 is a flowchart illustrating exemplary details of the suggested action determination processing performed at step S4 shown in FIG. 5, that is, suggested action determination processing performed based on the table shown in FIG. 9.

At step S61, the content suggesting unit 17 determines whether or not the viewing state variable S has the value S_1 (value indicating WATCHING).

When the viewing state variable S has the value S_1, it is determined that the answer at step S61 is YES, and the processing advances to step S68.

At step S68, the content suggesting unit 17 sets the value A1 indicating the action DO NOTHING as the suggested action variable A. That is to say, the value A1 indicating the action DO NOTHING is calculated, and the suggested action determination processing is finished. Consequently, the processing advances from step S4 to step S5 as shown in FIG. 5.

On the contrary, when the viewing state variable S is a value different from the value S_1, it is determined that the answer at step S61 is NO, and the processing advances to step S62.

At step S62, the content suggesting unit 17 determines whether or not the viewing state variable S is the value S_2 (value indicating BORINGL1).

If the viewing state variable S is the value S_2, it is determined that the answer at step S62 is YES, and the processing advances to step S69.

At step S69, the content suggesting unit 17 sets the value A2 indicating the action VERIFY as the suggested action variable A. That is to say, the value A2 indicating the action VERIFY is calculated, and the suggested action determination processing is finished. Consequently, the processing advances from step S4 to step S5 as shown in FIG. 5.

On the contrary, when the viewing state variable S is a value different from the value S_2, it is determined that the answer at step S62 is NO, and the processing advances to step S63.

At step S63, the content suggesting unit 17 determines whether or not the viewing state variable S is the value S_3 (value indicating BORINGL2).

If the viewing state variable S is the value S_3, it is determined that the answer at step S63 is YES, and the processing advances to step S70.

At step S70, the content suggesting unit 17 sets the value A3 indicating the action ACTION1 as the suggested action variable A. That is to say, the value A3 indicating the action ACTION1 is calculated, and the suggested action determination processing is finished. Consequently, the processing advances from step S4 to step S5 as shown in FIG. 5.

On the contrary, when the viewing state variable S is a value different from the value S_3, it is determined that the answer at step S63 is NO, and the processing advances to step S64.

At step S64, the content suggesting unit 17 determines whether or not the viewing state variable S is the value S_4 (value indicating NOT WATCHING).

If the viewing state variable S is the value S_4, it is determined that the answer at step S64 is YES, and the processing advances to step S71.

At step S71, the content suggesting unit 17 sets the value A4 indicating the action ACTION2 as the suggested action variable A. That is to say, the value A4 indicating the action ACTION2 is calculated, and the suggested action determination processing is finished. Consequently, the processing advances from step S4 to step S5 as shown in FIG. 5.

On the contrary, when the viewing state variable S is a value different from the value S_4, it is determined that the answer at step S64 is NO, and the processing advances to step S65.

At step S65, the content suggesting unit 17 determines whether or not the viewing state variable S is the value S_5 (value indicating SLEEPING).

If the viewing state variable S is the value S_5, it is determined that the answer at step S65 is YES, and the processing advances to step S72.

At step S72, the content suggesting unit 17 sets the value A5 indicating the action ACTION3 as the suggested action variable A. That is to say, the value A5 indicating the action ACTION3 is calculated, and the suggested action determination processing is finished. Consequently, the processing advances from step S4 to step S5 as shown in FIG. 5.

On the contrary, when the viewing state variable S is a value different from the value S_5, it is determined that the answer at step S65 is NO, and the processing advances to step S66.

At step S66, the content suggesting unit 17 determines whether or not the viewing state variable S is the value S_6 (value indicating AWAY).

If the viewing state variable S is the value S_6, it is determined that the answer at step S66 is YES, and the processing advances to step S73.

At step S73, the content suggesting unit 17 sets the value A6 indicating the action TURN OFF as the suggested action variable A. That is to say, the value A6 indicating the action TURN OFF is calculated, and the suggested action determination processing is finished. Consequently, the processing advances from step S4 to step S5 as shown in FIG. 5.

On the contrary, when the viewing state variable S is a value different from the value S_6, it is determined that the answer at step S66 is NO, and the processing advances to step S67.

At step S67, the content suggesting unit 17 sets the value A1 indicating the action DO NOTHING as the suggested action variable A. That is to say, the value A1 indicating the action DO NOTHING is calculated, and the suggested action determination processing is finished. Consequently, the processing advances from step S4 to step S5 as shown in FIG. 5.

When the above-described suggested action determination processing is finished, the processing corresponding to step S4 shown in FIG. 5 is finished and the processing advances to step S5.

If the suggested action variable A is changed as a result of the above-described series of processing procedures corresponding to steps S1 to S4, it is determined that the answer at step S5 is YES and the processing advances to step S6.

At step S6, the content suggesting unit 17 makes various types of suggestions relating to the content data based on the value of the suggested action variable A.

For example, when the value A1 indicating the action DO NOTHING is set as the suggested action variable A, the content suggesting unit 17 suggests the action DO NOTHING. Namely, the content suggesting unit 17 does not suggest anything.

For example, when the value A2 indicating the action VERIFY is set as the suggested action variable A, the content suggesting unit 17 suggests the action VERIFY. For example, the content suggesting unit 17 determines whether or not the display of content data currently viewed by the user U should be continued.

For example, when the value A3 indicating the action ACTION1 is set as the suggested action variable A, the content suggesting unit 17 suggests the action ACTION1. More specifically, for example, if a suggested action performed to suggest viewing alternate content data is defined as the action ACTION1, the content suggesting unit 17 suggests viewing arbitrary alternate content data, for example.

For example, when the value A4 indicating the action ACTION2 is set as the suggested action variable A, the content suggesting unit 17 suggests the action ACTION2. More specifically, for example, if a suggested action performed to recommend alternate content data is defined as the action ACTION2, the content suggesting unit 17 recommends alternate predetermined content data and suggests viewing the predetermined content data.

For example, when the value A5 indicating the action ACTION3 is set as the suggested action variable A, the content suggesting unit 17 suggests the action ACTION3. More specifically, for example, if a suggested action performed to stop content data which is currently displayed is defined as the action ACTION3, the content suggesting unit 17 suggests that the currently displayed content data be stopped, for example. Here, the content suggesting unit 17 may directly stop the currently displayed content data.

For example, when the value A6 indicating the action TURN OFF is set as the suggested action variable A, the content suggesting unit 17 suggests the action TURN OFF (turn off the power). Here, the content suggesting unit 17 may directly turn off the power of the content suggesting system.

Hereinafter, the content suggestion processing will further be described with reference to specific examples.

Figure 11:
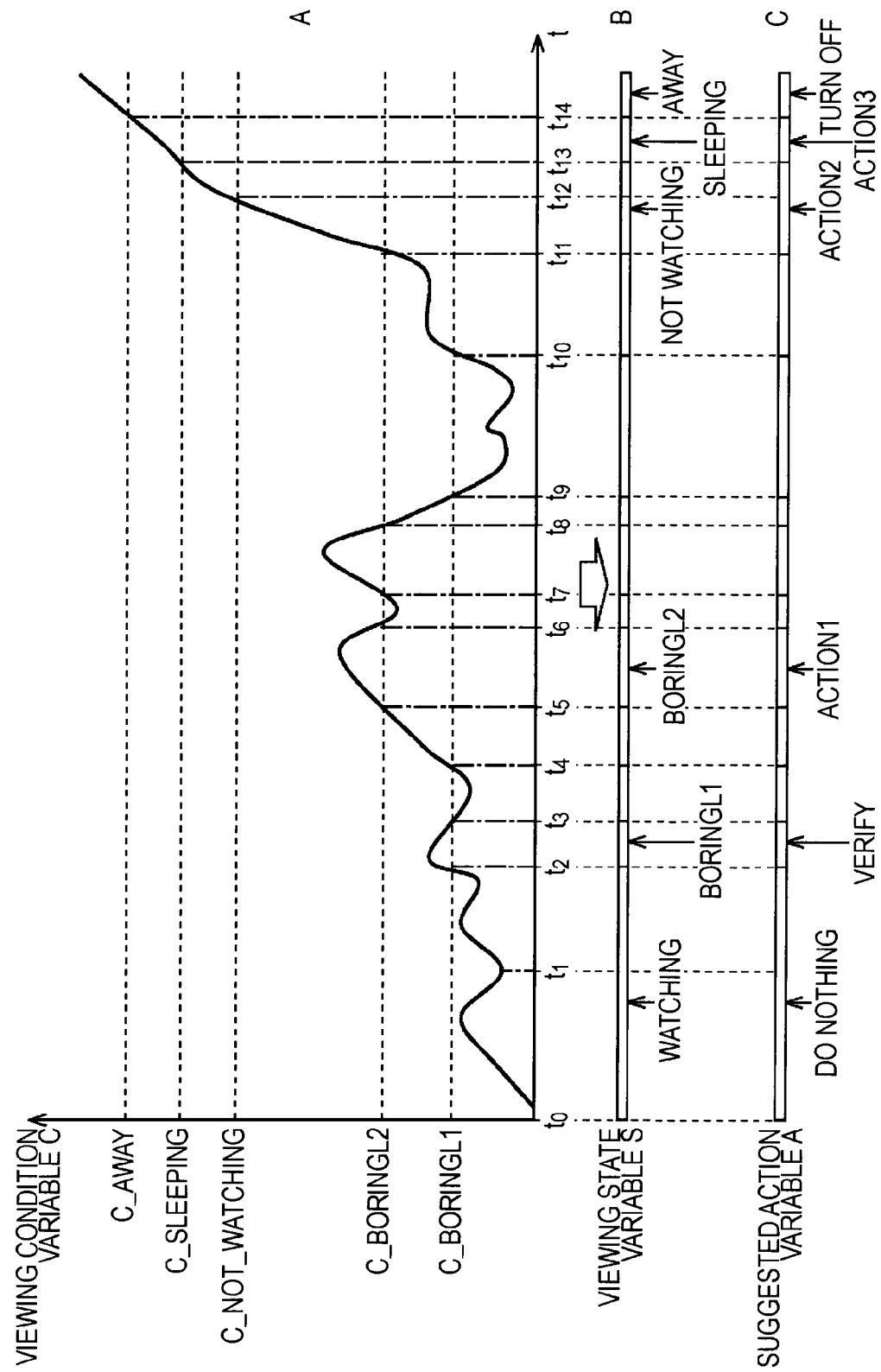
FIG. 11 is a diagram showing a specific result of content suggestion processing shown in FIG. 5.

FIG. 11 shows a specific result of the content suggestion processing shown in FIG. 5.

Part A of FIG. 11 shows the progression of the viewing condition variable C over time, the progression being observed at each time t. In Part A of FIG. 11, the vertical axis indicates the viewing condition variable C. Further, the threshold values described with reference to the table shown in FIG. 7 are shown along the vertical axis. Namely, the individual threshold values C_BORINGL1, C_BORINGL2, C_NOT_WATCHING, C_SLEEPING, C_AWAY are set in increasing order as the threshold values provided for the viewing condition variable C. The horizontal axis is a time base indicating the time t. The above-described time base is shared among Parts A, B, and C of FIG. 11.

Part B of FIG. 11 shows the progression of the viewing state corresponding to the viewing state variable S over time, the progression being observed at each time t. Part C of FIG. 11 shows the progression of the suggested action corresponding to the suggested action variable A over time.

FIG. 11 exemplarily shows that loop processing including steps S1 to S7 of the content suggestion processing shown in FIG. 5 is performed once for each time t (in seconds, for example). In that case, the viewing condition estimation processing corresponding to step S2 is performed once for each time t so that the value of the viewing condition variable C is ceaselessly changed. When the value of the viewing condition variable C is changed beyond predetermined limits, the value of the viewing state variable S is changed during the viewing state estimation processing corresponding to step S3 performed at the time t when the value of the viewing condition variable C is changed. Thus, the value of the viewing state variable S is changed so that the value of the suggested action variable A is changed through the suggested action determination processing performed at the next step or step S4. As a result, a suggestion is made based on the changed value of the suggested action variable A through the processing performed at the next step or step S6.

More specifically, the value of the viewing condition variable C is initialized to zero at time t0 through the viewing condition estimation processing performed at step S2 of the content suggestion processing shown in FIG. 5, for example (YES at step S21, and step S22 that are shown in FIG. 6). Consequently, the value S_1 is estimated and calculated as the viewing state variable S through the viewing state estimation processing corresponding to step S3 performed at time t0 (NO at step S41, and step S47 that are shown in FIG. 8). Therefore, the viewing state attained at time t0 becomes the action WATCHING corresponding to the value S_1. Therefore, the value A1 is set as the value of the suggested action variable A through the suggested action determination processing corresponding to step S4 performed at time t0 (YES at step S61, and step S68 that are shown in FIG. 10). Therefore, the suggested action performed at time t0 becomes the action DO NOTHING corresponding to the value A. Since the value A1 is calculated again as the suggested action variable A at time to, it is determined that the answer obtained through processing performed at step S5 is YES, and the action DO NOTHING is suggested based on the value A1 of the suggested action variable A through processing performed at the next step or step S6.

At time t1, during the viewing condition estimation processing corresponding to step S2 of the content suggestion processing shown in FIG. 5, the value of the viewing condition variable C is estimated and calculated as a value shown in Part A of FIG. 11, that is, a value falling within the range of from zero to less than the threshold value C_BORINGL1. Therefore, during the viewing state estimation processing corresponding to step S3 performed at time t1, the value S_1 is estimated and calculated as the viewing state variable S (NO at step S41, and step S47 that are shown in FIG. 8). Therefore, the viewing state attained at time t1 becomes the action WATCHING corresponding to the value S_1. Therefore, the value A1 is set as the value of the suggested action variable A through the suggested action determination processing corresponding to step S4 performed at time t1 (YES at step S61, and step S68 that are shown in FIG. 10). Consequently, the suggested action performed at time t1 becomes the action DO NOTHING corresponding to the value A. Thus, the value A1 is calculated as the suggested action variable A at time t1. However, since the same value A1 is calculated as the suggested action variable A at the previous time t (e.g., time t0), it is determined that the answer is NO at step S5 performed at time t1, and the processing returns to step S1 so that a series of the processing procedures is started at the next time t. Namely, in that case, the suggestion for the action DO NOTHING, which is made based on the value A1 of the suggested action variable A, is maintained.

At time t2, during the viewing condition estimation processing corresponding to step S2 of the content suggestion processing shown in FIG. 5, the value of the viewing condition variable C is estimated and calculated as a value shown in Part A of FIG. 11, that is, a value falling within the range of from the threshold value C_BORINGL1 to less than the threshold value C_BORINGL2. Therefore, during the viewing state estimation processing corresponding to step S3 performed at time t2, the value S_2 is estimated and calculated as the viewing state variable S (NO at step S42, and step S48 that are shown in FIG. 8). Therefore, the viewing state attained at time t2 becomes the action BORINGL1 corresponding to the value S_2. Therefore, the value A2 is set as the value of the suggested action variable A through the suggested action determination processing corresponding to step S4 performed at time t2 (YES at step S62, and step S69 that are shown in FIG. 10). Consequently, the suggested action performed at time t2 becomes the action VERIFY corresponding to the value A. Thus, the value A2 is calculated as the suggested action variable A at time t2. Since the value A2 is calculated again as the suggested action variable A at time t2, it is determined that the answer obtained through the processing performed at step S5 is YES, and the action VERIFY is suggested based on the value A2 of the suggested action variable A through the processing performed at the next step or step S6.

At time t5, during the viewing condition estimation processing performed at step S2 of the content suggestion processing shown in FIG. 5, the value of the viewing condition variable C is estimated and calculated as a value shown in Part A of FIG. 11, that is, a value falling within the range of from the threshold value C_BORINGL2 to less than the threshold value C_NOT_WATCHING. Therefore, during the viewing state estimation processing corresponding to step S3 performed at time t5, the value S_3 is estimated and calculated as the viewing state variable S (NO at step S43, and step S49 that are shown in FIG. 8). Therefore, the viewing state attained at time t5 becomes the action BORINGL2 corresponding to the value S_3. Therefore, the value A3 is set as the value of the suggested action variable A through the suggested action determination processing corresponding to step S4 performed at time t5 (YES at step S63, and step S70 that are shown in FIG. 10). Consequently, the suggested action performed at time t5 becomes the action ACTION1 corresponding to the value A. Thus, the value A3 is calculated as the suggested action variable A at time t5. Since the value A3 is calculated again as the suggested action variable A at time t5, it is determined that the answer obtained through the processing performed at step S5 is YES, and the action ACTION1 is suggested based on the value A3 of the suggested action variable A through the processing performed at the next step or step S6.

The same processing is performed again at time t coming after time t5. Namely, since the value of the suggested action variable A is updated at each of time t6 to time t14, it is determined that the answer obtained through the processing performed at step S5 is YES, and various types of suggestions are made based on the updated value of the suggested action variable A through the processing performed at the next step or step S6. Then, since the same value is calculated as the suggested action variable A at each of time t6 to time t14, it is determined that the answer obtained through the processing performed at step S5 is NO so that the processing returns to step S1 and the series of processing procedures is started at the next time t. Namely, in that case, the same suggestion is maintained.

Thus, the value of the viewing state variable S and that of the suggested action variable A are changed as the value of the viewing condition variable C is changed. Then, the suggested action is performed based on the changed value of the suggested action variable A. Consequently, the content suggesting system 1 allows for taking an action so as to suggest content data appropriate for the viewing condition of the user U.

[Exemplary Configuration of Content Suggesting System 2]

Figure 12:
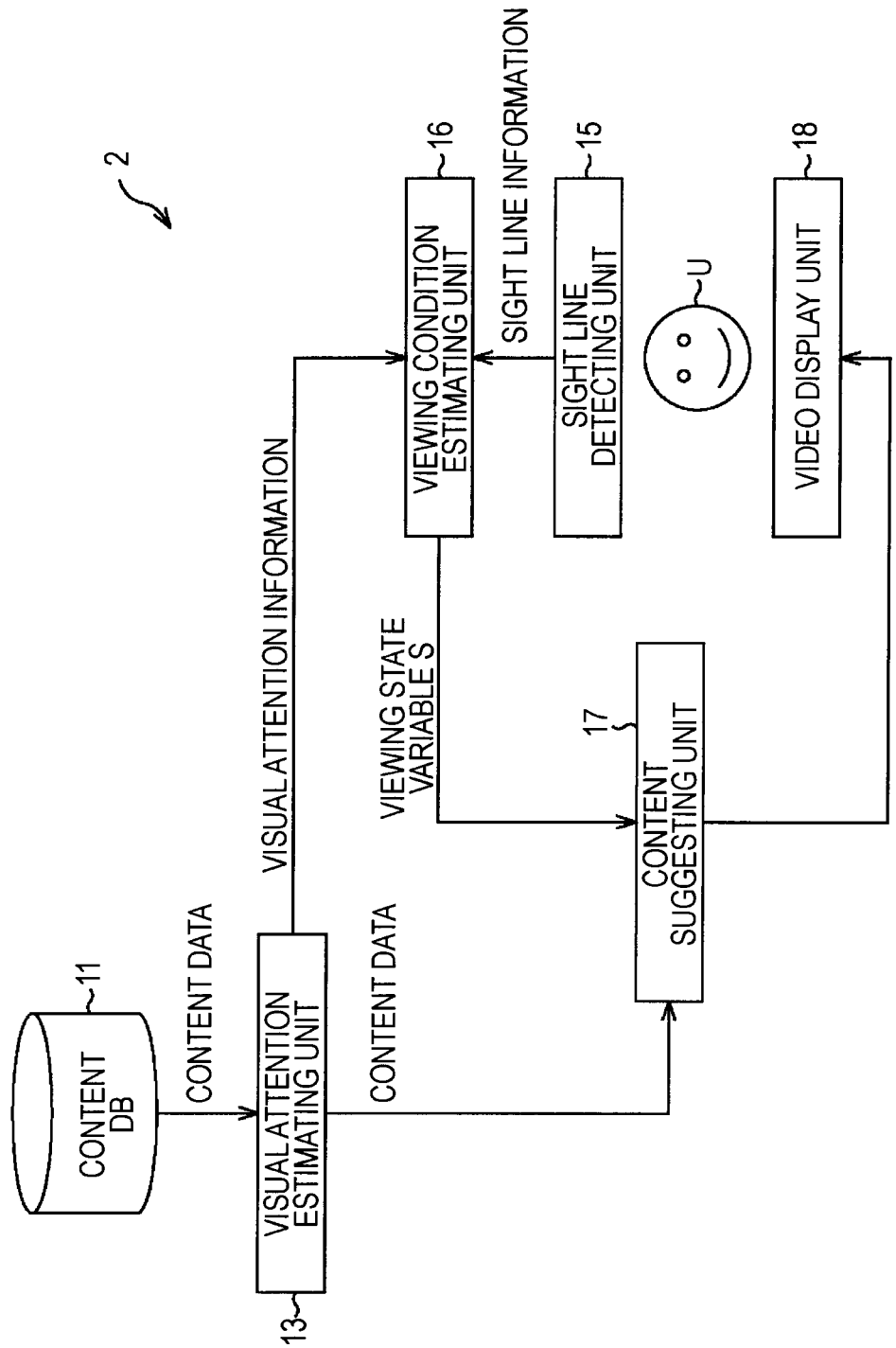
FIG. 12 is a functional block diagram showing an exemplary functional configuration of a content suggesting system provided as an information processing system according to an embodiment of the present invention, where the functional block diagram shows an example different from that of FIG. 2.

FIG. 12 shows an information processing system according to an embodiment of the present invention. Namely, FIG. 12 is a functional block diagram showing an exemplary functional configuration of a content suggesting system 2 different from the exemplary content suggesting system shown in FIG. 2.

The content suggesting system 2 includes the content DB 11, the visual attention estimating unit 13, the sight line detecting unit 15, the viewing condition estimating unit 16, the content suggesting unit 17, and the video display unit 18.

In FIG. 12, the same components as those shown in FIG. 2 are designated by the same reference numerals. Further, redundant descriptions will be omitted as appropriate.

In the content suggesting system 1 shown in FIG. 2, the visual attention information is temporarily stored in the visual attention DB 12, and presented to the viewing condition estimating unit 16. On the contrary, the visual attention DB 12 is omitted in the content suggesting system 2 shown in FIG. 12. Therefore, the visual attention information generated through the visual attention estimating unit 13 is presented to the viewing condition estimating unit 16 in real time.

Further, content data transmitted from the content DB 11 is presented to the content suggesting unit 17 via the visual attention estimating unit 13.

[Exemplary Configuration of Content Suggesting System 3]

Figure 13:
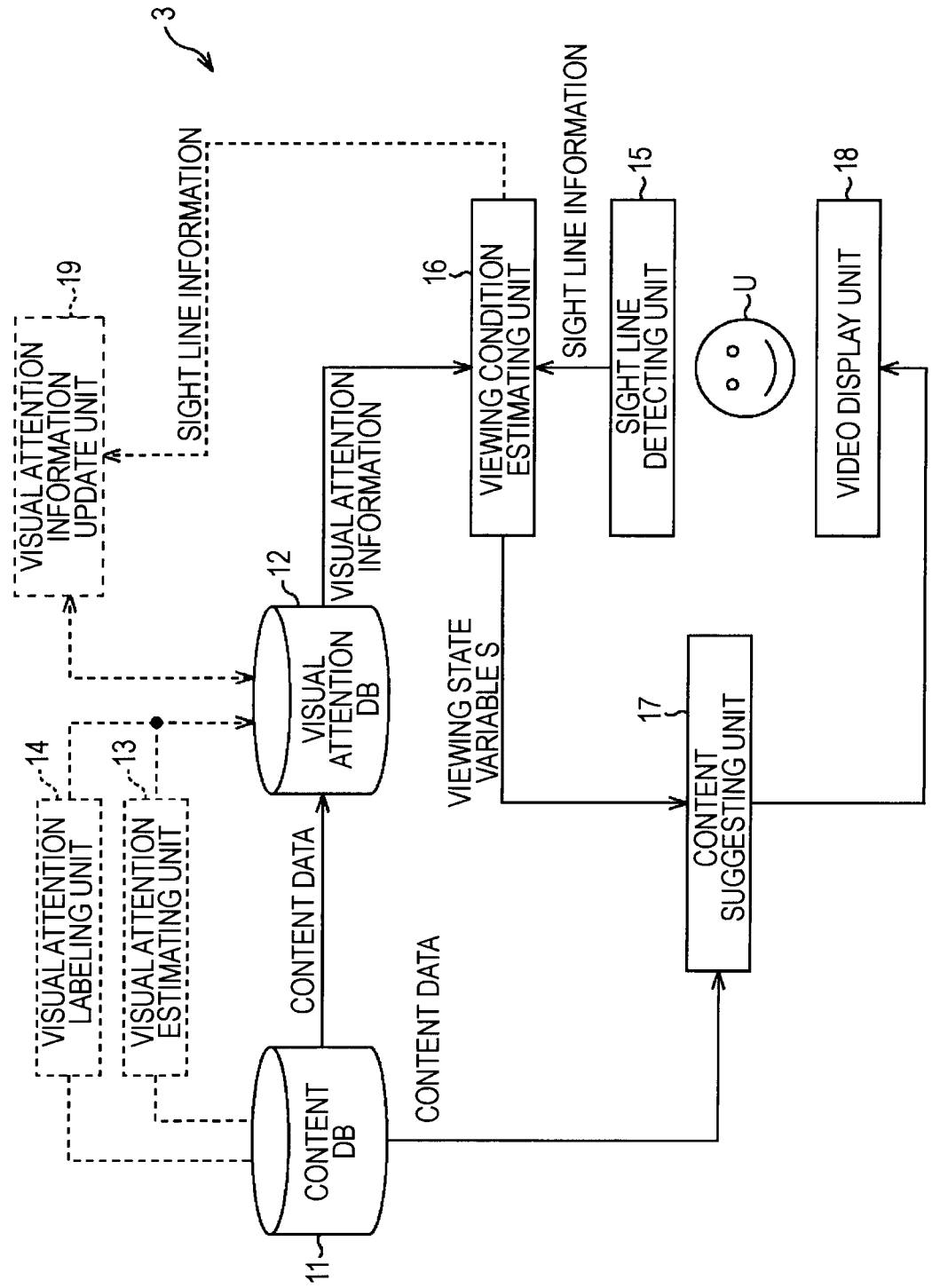
FIG. 13 is a functional block diagram showing an exemplary functional configuration of a content suggesting system provided as an information processing system according to an embodiment of the present invention, where the functional block diagram shows an example different from that of FIG. 2 and/or FIG. 12.

FIG. 13 shows an information processing system according to an embodiment of the present invention. Namely, FIG. 13 is a functional block diagram showing an exemplary functional configuration of a content suggesting system 3 different from the exemplary content suggesting systems shown in FIGS. 2 and 12.

In FIG. 13, the same components as those shown in FIG. 2 are designated by the same reference numerals. Further, redundant descriptions will be omitted as appropriate.

The content suggesting system 3 further includes a visual attention information update unit 19 in addition to the components of the content suggesting system 1 shown in FIG. 2.

The sight line information of the user U, which is transmitted from the sight line detecting unit 15 to the viewing condition estimating unit 16, is fed back to the visual attention information update unit 19. Therefore, the visual attention information update unit 19 updates each of visual attention information items that are stored in the visual attention DB 12 based on the sight line information of the user U, which is fed back to the visual attention information update unit 19. Thus, the visual attention information is updated based on the sight line information of the user U, which is transmitted from the viewing condition estimating unit 16, so that the visual attention information is affected by the viewing characteristic of the user U.

Figure 14:
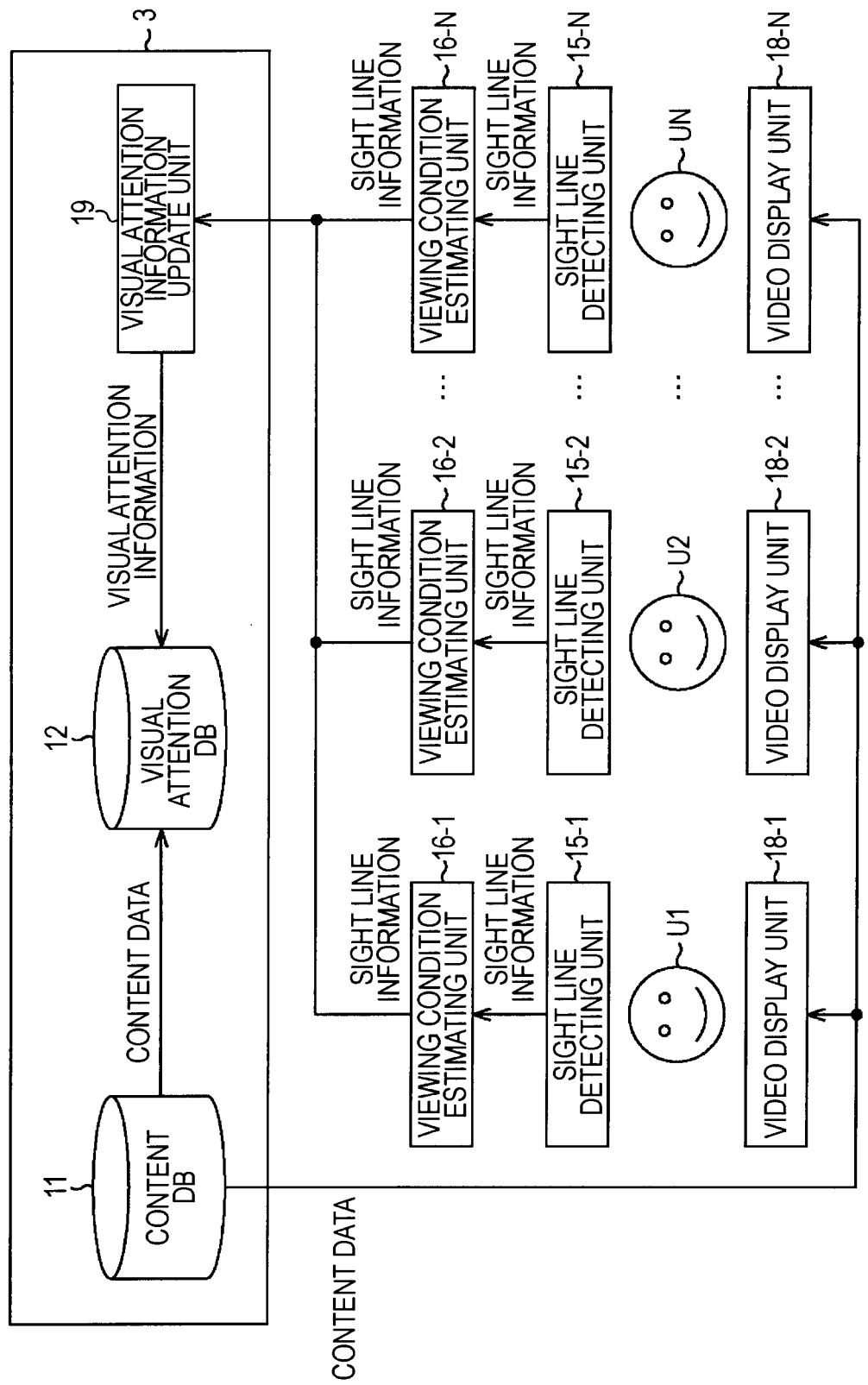
FIG. 14 is a diagram showing a specific example of the method of updating visual attention information, where the diagram shows an example different from that of FIG. 13.

Here, the method of updating the visual attention information, which is performed by the visual attention information update unit 19, is not particularly limited to the exemplary method shown in FIG. 13. For example, the method of updating the visual attention information based on the sight line information of at least two users U1 to UN (N denotes an integer value which is at least two) may be adopted as shown in FIG. 14. Here, the at least two users U1 to UN may include the user U.

[Specific Example of Method of Updating Visual Attention Information]

FIG. 14 shows a specific example of the method of updating the visual attention information, which is performed through the visual attention information update unit 19. Namely, FIG. 14 illustrates an example different from that shown in FIG. 13.

Namely, of the components of the content suggesting system 3 exemplarily shown in FIG. 13, FIG. 14 only shows the content DB 11, the visual attention DB 12, and the visual attention information update unit 19. Further, a single system equivalent to the content suggesting system 3 exemplarily shown in FIG. 13 is used for a user UK (K denotes an arbitrary integer value of 1 to N). Of the components of the above-described system, FIG. 14 only shows a video display unit 18-K, a sight line detecting unit 15-K, and a viewing condition estimating unit 16-K. Further, as long as the visual attention information update unit 19 of the content suggesting system 3 can acquire sight line information of each of the users U1 to UN, the method of generating the sight line information is not particularly limited to the example method shown in FIG. 14.

As shown in FIG. 14, the same content data is displayed on each of video display units 18-1 to 18-N. Consequently, the users U1 to UN can view the content data displayed on the individual video display units 18-1 to 18-N. Further, the time frames where the content data is displayed on the video display units 18-1 to 18-N may not be the same as each other as a matter of course.

Sight line detecting units 15-1 to 15-N present the sight line information items of the users U1 to UN who are viewing the content data to the individual viewing condition estimating units 16-1 to 16-N. The viewing condition estimating units 16-1 to 16-N transmit the individual sight line information items of the users U1 to UN to the visual attention information update unit 19.

The visual attention information update unit 19 updates the visual attention information items that are stored in the visual attention DB 12 by studying the sight line information items of the users U1 to UN as statistical data.

If the visual attention information items that are stored in the above-described visual attention DB 12 can be shared among systems used by the users U1 to UN, the visual attention information items can be shared among the users U and U1 to UN. According to the example shown in FIG. 14, the users U and U1 to UN use different systems. However, without being limited to the example shown in FIG. 14, at least part of the users U and U1 to UN may share and use the same system.

Incidentally, the above-described series of processing procedures can be executed through hardware and/or software.

Figure 15:
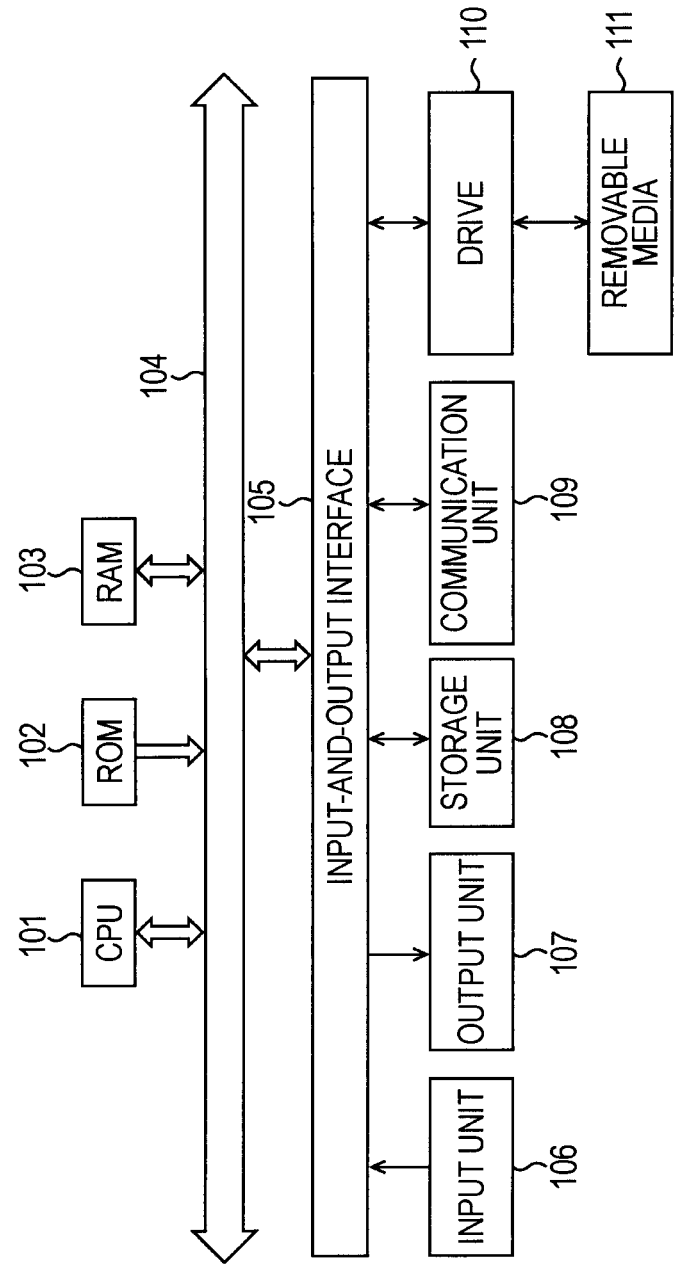
FIG. 15 is a block diagram showing personal computer hardware provided as an information processing system according to an embodiment of the present invention.

In that case, a personal computer shown in FIG. 15 may be, at least, part of the above-described information processing system.

In FIG. 15, a central processing unit (CPU) 101 executes various types of processing procedures based on a program stored in a read only memory (ROM) 102 and/or a program loaded from a storage unit 108 into a random access memory (RAM) 103. Further, data used by the CPU 101 so as to execute the various types of processing procedures is also stored in the RAM 103 as appropriate.

The CPU 101, the ROM 102, and the RAM 103 are connected to one another via a bus 104 to which an input-and-output interface 105 is connected.

The input-and-output interface 105 is connected to an input unit 106 including a keyboard, a mouse, and so forth, an output unit 107 including a display or the like, a storage unit 108 including a hard disk or the like, and a communication unit 109 including a modem, a terminal adapter, and so forth. The communication unit 109 controls communications performed between the personal computer and a different apparatus (not shown) via a network including the Internet.

Further, a drive 110 is connected to the input-and-output interface 105 as appropriate, and removable media 111 including a magnetic disk, an optical disk, a magneto-optical disk, a semiconductor memory, and so forth is mounted on the input-and-output interface 105 as appropriate. A computer program read from the removable media 111 is installed in the storage unit 108 as appropriate.

When a series of processing procedures is executed through software, a program constituting the software is installed from a network and/or a recording medium into a computer included in specifically designed computer and/or a general-purpose personal computer that can execute various functions through various programs installed therein.

The recording medium including the above-described program includes not only the removable media (packaged media) 111 including a magnetic disk (including a floppy disk), an optical disk (including a compact disk-read only memory (CD-ROM) and a digital versatile disk (DVD)), a magneto-optical disk (including a mini-disk (MD)), a semiconductor memory, and so forth, where the removable media 111 is separated from the main body of the apparatus and distributed to present the program to the user, and stores the program, but also the ROM 102, a hard disk included in the storage unit 108, and so forth that store the program and that are included in the main body of the apparatus in advance and presented to the user as shown in FIG. 15.

Further, in this specification, steps describing the program stored in the recording medium include not only processing executed in time sequence according to the written order but also processing that is not necessarily executed in time sequence but can be executed in parallel and/or separately.

The present application contains subject matter related to that disclosed in Japanese Priority Patent Application JP 2008-332131 filed in the Japan Patent Office on Dec. 26, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   a sight line detecting means arranged to detect a sight line of a viewer who is viewing a first content data and output detected sight line information;
   a viewing condition estimating means arranged to:
      estimate a viewing condition of the viewer by comparing the detected sight line information with visual attention information relating to the first content data, the visual attention information being determined prior to detecting the sight line of the viewer, and denoting a degree of sight line concentration associated with each region of each image included in the first content data; and
      estimate a viewing state based on a result of the viewing condition estimation;
   a content suggesting means arranged to suggest a second content data for the viewer based on the estimated viewing condition,
      wherein the content suggesting means suggests the second content data corresponding to the estimated viewing state; and
   a visual attention information updating means configured to update the visual attention information denoting the degree of sight line concentration associated with each region of each image included in the first content data using the detected sight line information.

2. The information processing apparatus according to claim 1,
   wherein a viewing condition variable indicating the viewing condition of the viewer is defined and at least one predetermined type of viewing state is associated with each of at least two possible ranges of the viewing condition variable, and
   wherein the viewing condition estimating means estimates the viewing condition by calculating a value of the viewing condition variable, and estimates the viewing state by determining a viewing state of a type associated with a range to which the value of the viewing condition variable belongs of the at least two possible ranges.

3. The information processing apparatus according to claim 2,
   wherein at least one predetermined type of suggested action is associated with each of at least two types of the viewing states, and
   wherein the content suggesting means makes a suggestion for the viewer based on a suggested action of a type associated with the viewing state of a type determined through the viewing condition estimating means.

4. The information processing apparatus according to claim 2,
   wherein a score is variable based on a magnitude of the visual attention information about a region where a sight line of the viewer stays, and
   wherein the viewing condition estimating means calculates the score based on the detected sight line information output from the sight line detecting means immediately before and the visual attention information relating to the first content data in a cycle of a predetermined time, and calculates a value of a viewing condition variable based on the score obtained on each of at least one occasion, which is obtained by a current period.

5. The information processing apparatus according to claim 1, wherein the visual attention information updating means is further configured to update the visual attention information using sight line information detected by a plurality of sight line detecting means associated with a plurality of viewers who are viewing the same first content data.

6. An information processing method comprising the steps of:
   detecting a sight line of a viewer who is viewing a first content data and outputting detected sight line information;
   estimating a viewing condition of the viewer by comparing the detected sight line information with visual attention information relating to the first content data, the visual attention information being determined prior to detecting the sight line of the viewer, and denoting a degree of sight line concentration associated with each region of each image included in the first content data;
estimating a viewing state based on a result of the viewing condition estimation;
suggesting a second content data for the viewer based on the estimated viewing condition,
wherein the second content data corresponds to the estimated viewing state; and
updating the visual attention information denoting the degree of sight line concentration associated with each region of each image included in the first content data using the detected sight line information.

7. The information processing method according to claim 6, further comprising:
defining a viewing condition variable indicating the viewing condition of the viewer; and
associating at least one predetermined type of viewing state with each of at least two possible ranges of the viewing condition variable,
wherein estimating the viewing condition further comprises calculating a value of the viewing condition variable, and
wherein estimating the viewing state further comprises determining a viewing state of a type associated with a range to which the value of the viewing condition variable belongs of the at least two possible ranges.

8. The information processing method according to claim 7, further comprising:
associating at least one predetermined type of suggested action with each of at least two types of the viewing states,
wherein suggesting the second content data for the viewer comprises suggesting the second content data based on a suggested action of a type associated with a type of the viewing state.

9. The information processing method according to claim 7,
wherein a score is variable based on a magnitude of the visual attention information about a region where a sight line of the viewer stays, and
the method further comprising:
calculating the score based on the detected sight line information immediately before and the visual attention information relating to the first content data in a cycle of a predetermined time; and
calculating a value of a viewing condition variable based on the score obtained on each of at least one occasion, which is obtained by a current period.

10. The information processing method according to claim 6, wherein updating the visual attention information further comprises updating the visual attention information using sight line information detected from a plurality of viewers who are viewing the same first content data.

11. A non-transitory, computer-readable storage medium storing a program that, when executed by a computer, causes the computer to execute control processing including the steps of:
detecting a sight line of a viewer who is viewing a first content data and outputting detected sight line information;
estimating a viewing condition of the viewer by comparing the detected sight line information with visual attention information relating to the first content data, the visual attention information being determined prior to detecting the sight line of the viewer, and denoting a degree of sight line concentration associated with each region of each image included in the first content data;
estimating a viewing state based on a result of the viewing condition estimation;
suggesting a second content data for the viewer based on the estimated viewing condition,
wherein the second content data corresponds to the estimated viewing state; and
updating the visual attention information denoting the degree of sight line concentration associated with each region of each image included in the first content data using the detected sight line information.

12. The non-transitory, computer-readable storage medium according to claim 11, wherein the control processing further comprises:
defining a viewing condition variable indicating the viewing condition of the viewer; and
associating at least one predetermined type of viewing state with each of at least two possible ranges of the viewing condition variable,
wherein estimating the viewing condition further comprises calculating a value of the viewing condition variable, and
wherein estimating the viewing state further comprises determining a viewing state of a type associated with a range to which the value of the viewing condition variable belongs of the at least two possible ranges.

13. The non-transitory, computer-readable storage medium according to claim 12, further comprising:
associating at least one predetermined type of suggested action with each of at least two types of the viewing states,
wherein suggesting the second content data for the viewer comprises suggesting the second content data based on a suggested action of a type associated with a type of the viewing state.

14. The non-transitory, computer-readable storage medium according to claim 12,
wherein a score is variable based on a magnitude of the visual attention information about a region where a sight line of the viewer stays, and
the method further comprising:
calculating the score based on the detected sight line information immediately before and the visual attention information relating to the first content data in a cycle of a predetermined time; and
calculating a value of a viewing condition variable based on the score obtained on each of at least one occasion, which is obtained by a current period.

15. The non-transitory, computer-readable storage medium according to claim 11, wherein updating the visual attention information further comprises updating the visual attention information using sight line information detected from a plurality of viewers who are viewing the same first content data.

16. An information processing apparatus comprising:
a sight line detecting unit configured to detect a sight line of a viewer who is viewing a first content data and output detected sight line information;
a viewing condition estimating unit configured to:
estimate a viewing condition of the viewer by comparing the detected sight line information with visual attention information relating to the first content data, the visual attention information being determined prior to detecting the sight line of the viewer, and denoting a degree of sight line concentration associated with each region of each image included in the first content data; and estimate a viewing state based on a result of the viewing condition estimation;

a content suggesting unit configured to suggest a second content data for the viewer based on the estimated viewing condition, wherein the content suggesting unit suggests the second content data corresponding to the estimated viewing state; and a visual attention information updating unit configured to update the visual attention information denoting the degree of sight line concentration associated with each region of each image included in the first content data using the detected sight line information.

17. The information processing apparatus according to claim 16 wherein at least one of the first or second content data comprises a program provided to present information related to at least one of character, drawing, color, voice, action, or video of a movie, music, a play, a literature, a photograph, a cartoon, animation, or a computer game.

18. The information processing apparatus according to claim 16, wherein a viewing condition variable indicating the viewing condition of the viewer is defined and at least one predetermined type of viewing state is associated with each of at least two possible ranges of the viewing condition variable, and wherein the viewing condition estimating unit estimates the viewing condition by calculating a value of the viewing condition variable, and estimates the viewing state by determining a viewing state of a type associated with a range to which the value of the viewing condition variable belongs of the at least two possible ranges.

19. The information processing apparatus according to claim 18, wherein at least one predetermined type of suggested action is associated with each of at least two types of the viewing states, and wherein the content suggesting unit makes a suggestion for the viewer based on a suggested action of a type associated with the viewing state of a type determined through the viewing condition estimating unit.

20. The information processing apparatus according to claim 18, wherein a score is variable based on a magnitude of the visual attention information about a region where a sight line of the viewer stays, and wherein the viewing condition estimating unit calculates the score based on the detected sight line information output from the sight line detecting unit immediately before and the visual attention information relating to the first content data in a cycle of a predetermined time, and calculates a value of a viewing condition variable based on the score obtained on each of at least one occasion, which is obtained by a current period.

21. The information processing apparatus according to claim 16, wherein the visual attention information updating unit is further configured to update the visual attention information using sight line information detected by a plurality of sight line detecting units associated with a plurality of viewers who are viewing the same first content data.

* * * * *